(12) United States Patent
Suzuki et al.

(10) Patent No.: US 11,489,407 B2
(45) Date of Patent: Nov. 1, 2022

(54) ELECTRICALLY POWERED TOOL

(71) Applicant: Koki Holdings Co., Ltd., Tokyo (JP)

(72) Inventors: Ryo Suzuki, Ibaraki (JP); Ken Miyazawa, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 111 days.

(21) Appl. No.: 16/608,204

(22) PCT Filed: Mar. 30, 2018

(86) PCT No.: PCT/JP2018/013673
§ 371 (c)(1),
(2) Date: Oct. 25, 2019

(87) PCT Pub. No.: WO2018/198671
PCT Pub. Date: Jan. 11, 2018

(65) Prior Publication Data
US 2021/0099052 A1    Apr. 1, 2021

(30) Foreign Application Priority Data

Apr. 27, 2017  (JP) .............................. JP2017-087873

(51) Int. Cl.
*H02K 7/14*    (2006.01)
*H02K 11/35*   (2016.01)
*H02K 1/274*   (2022.01)

(52) U.S. Cl.
CPC ............. *H02K 7/145* (2013.01); *H02K 1/274* (2013.01); *H02K 11/35* (2016.01)

(58) Field of Classification Search
CPC ............ H02K 7/14; H02K 9/06; H02K 5/148; H02K 7/145; B24B 23/02; B24B 23/028; B24B 49/10; B25F 5/00; B25F 5/008
See application file for complete search history.

(56) References Cited

U.S. PATENT DOCUMENTS 10,173,311 B2 *  1/2019  Takeda ................... B24B 23/02
10,886,816 B2 *  1/2021  Doan ..................... H02K 3/522
(Continued)

FOREIGN PATENT DOCUMENTS

JP      2006340555      12/2006
JP      2007196363       8/2007
(Continued)

OTHER PUBLICATIONS

JP-2013017201 A machine translation on Jun. 5, 2021.*
(Continued)

*Primary Examiner* — Leda T Pham
(74) *Attorney, Agent, or Firm* — JCIPRNET

(57) ABSTRACT

Provided is an electrically powered tool having an improved sensor substrate mounting structure, the electrically powered tool being configured so that a brushless type motor is axially contained in a cylindrical housing. The electrically powered tool has: a cylindrical housing for axially containing a motor; a control unit for controlling the motor; and a sensor substrate having mounted thereon a plurality of position detecting elements for detecting the rotational position of a rotor. The sensor substrate is gripped between the insulator of the motor and the housing and held on the housing side when axially mounting the motor. The sensor substrate is annularly shaped and has formed at the center thereof a through-hole through which a bearing for the motor is passed. The portion of the sensor substrate, on which a Hall IC is mounted, is provided with a synthetic resin cover member for protecting the Hall IC against dust.

15 Claims, 11 Drawing Sheets

(56) References Cited

U.S. PATENT DOCUMENTS

| | | | |
|---|---|---|---|
| 2011/0171887 A1 | 7/2011 | Tanimoto et al. | |
| 2015/0364972 A1* | 12/2015 | Ito | B25F 5/00 310/50 |
| 2017/0110935 A1 | 4/2017 | Oktavec et al. | |
| 2019/0061132 A1* | 2/2019 | Mori | B25F 5/026 |

FOREIGN PATENT DOCUMENTS

| | | | |
|---|---|---|---|
| JP | 2007295773 | 11/2007 | |
| JP | 2009072880 | 4/2009 | |
| JP | 2010214518 | 9/2010 | |
| JP | 2010269409 | 12/2010 | |
| JP | 2013017201 A * | 1/2013 | G09G 3/3283 |
| JP | 2013107201 | 6/2013 | |
| JP | 2016101634 | 6/2016 | |
| JP | 2017007032 | 1/2017 | |
| JP | 2017013141 | 1/2017 | |
| WO | 2016002541 | 1/2016 | |

OTHER PUBLICATIONS

"International Search Report (Form PCT/ISA/210)" of PCT/JP2018/013673, dated May 29, 2018, with English translation thereof, pp. 1-4.

"Search Report of Europe Counterpart Application", dated Oct. 2, 2020, pp. 1-8.

"Office Action of China Counterpart Application" with English translation thereof, dated Apr. 25, 2022, p. 1-p. 15.

* cited by examiner

ELECTRICALLY POWERED TOOL

CROSS-REFERENCE TO RELATED APPLICATION

This application is a 371 application of the international PCT application serial no. PCT/JP2018/013673, filed on Mar. 30, 2018, which claims the priority benefit of Japan application no. 2017-087873, filed on Apr. 27, 2017. The entirety of each of the abovementioned patent applications is hereby incorporated by reference herein and made a part of this specification.

BACKGROUND

Technical Field

The present disclosure relates to an electrically powered tool using a brushless motor.

Description of Related Art

According to a mobile electrically powered tool such as a disc grinder, a handle that is coupled to a motor housing for holding a motor such that the handle projects backward from the motor housing is provided, and an operator performs an operation while gripping the handle with one hand and pressing the motor housing itself or a side handle attached to the motor housing with the other hand, A housing for a disc grinder has a housing made of metal or a synthetic resin, the motor housing has a cylindrical integrated shape instead of a divided form since a disc grinder with an intermediate or larger size has a large motor size and a large output, and a handle housing of a left-right divided type is attached to the back side thereof. The motor is inserted into an opening on the front side (the side opposite to the handle housing) of the cylindrical motor housing toward the back side in an axial direction. As a grinder with such a motor attachment structure, Patent Literature 1 is known. Here, a motor housing is an integrated molded article of a synthetic resin, and a rotational shaft of a motor is axially supported with a bearing secured to the motor housing and a bearing secured to a member that covers the opening on the front side of the motor housing.

CITATION LIST

Patent Literature

[Patent Literature 1] Japanese Patent Laid-Open No. 2017-13141
[Patent Literature 2] Japanese Patent Laid-Open No. 2010-214518

SUMMARY

Technical Problem

In recent years, there has been a trend that highly precise rotation control is performed and a higher output is aimed for by employing a brushless DC motor for an electrically powered tool. The brushless DC motor is driven using an inverter circuit that uses a semiconductor switching element. A field effect transistor (FET), an insulating gate bipolar transistor (IGBT), or the like is used as the semiconductor switching element used in the inverter circuit, and it is necessary to accurately detect a rotor position in order to control the semiconductor switching element. In the brushless DC motor in the related art, a method of providing a dedicated sensor magnet at an end of a rotational shaft of a motor as in Japanese Patent Laid-Open No. 2017-13141, for example, disposing three magnetic detection elements such as Hall ICs so as to face the sensor magnet, and mounting the magnetic detection elements on a dedicated sensor substrate is used. In such an electrically powered tool, the entire length in a rotor axial direction, in particular, increases due to the sensor magnet provided for detecting a rotational position of the motor. Also, in the electrically powered tool as disclosed in Japanese Patent Laid-Open No. 2010-214518, a method of securing a sensor substrate to an insulator provided on a stator of a brushless motor with a screw is employed, the sensor substrate and the insulator increase in size due to securing portions (screw bosses) provided on each of the sensor substrate and the insulator, and as a result, there is a concern that a housing for containing the sensor substrate and the insulator will increase in size in a radial direction of the motor, in particular.

The present disclosure was made in view of the aforementioned problems, and an object thereof is to provide an electrically powered tool that enables prevention of an increase in size of a main body regardless of utilization of a sensor substrate and a brushless motor.

Another object of the disclosure is to provide an electrically powered tool that uses a brushless motor and has an improved sensor substrate mounting structure.

Solution to Problem

Representative features of the disclosure disclosed in the present application will be described as follows. According to a feature of the disclosure, there is provided an electrically powered tool including: a brushless motor that has a rotor and a stator; a cylindrical housing that contains the brushless motor in an axial direction; a control unit that controls the brushless motor; and a sensor substrate that has a sensor mounted thereon for detecting a rotational position of the rotor, in which the brushless motor is attached to the housing in the axial direction, and a surface of the sensor substrate on one side in the axial direction and a surface on the other side abut the stator and the housing such that the sensor substrate is sandwiched therebetween, thereby the sensor substrate being held with the housing. An insulating member that holds a coil is provided at an end of the stator in the axial direction, a base unit that holds the sensor substrate such that the sensor substrate does not move in the axial direction is provided on the housing, and the sensor substrate is sandwiched between the insulating member and the base unit.

According to another feature of the disclosure, there is provided an electrically powered tool including a sensor substrate that has a sensor mounted thereon for detecting a rotational position of a rotor, in which a brushless motor is attached to a housing in an axial direction, and the sensor substrate is secured on a side of the housing. The sensor substrate is an annular print substrate and is disposed such that the sensor substrate is orthogonal to a rotational shaft of the brushless motor, and has a plurality of magnetic detection elements mounted thereon such that the magnetic detection elements are disposed in a circumferential direction on a surface thereof on a side of the brushless motor. Also, the housing is a resin or metal integrated article and has a coupling unit that restricts a containing position of the brushless motor in the axial direction, a bearing holding unit that secures one of bearings that axially support the rotational shaft of the brushless motor is formed at an axial center position of the coupling unit, and the sensor substrate abuts the coupling unit on the side circumferentially outward from the bearing holding unit.

According to another feature of the disclosure, an inverter circuit for driving the brushless motor is provided, a plurality of permanent magnets are disposed in the rotor at equal intervals in the inner circumferential direction of the stator, the magnetic detection elements detect a change in a magnetic pole from the permanent magnets and output the change to the control unit, and the control unit controls the inverter circuit by detecting the rotational position of the rotor from the output of the magnetic detection elements. A cover member that covers the sensor such that the sensor is not exposed to outside is provided on the sensor substrate. A plurality of attachment units that extend outward in a radial direction from an annular portion are formed on the sensor substrate, and recessed portions into which the attachment units are fitted for identifying a position of the sensor substrate in the circumferential direction are formed on the base unit of the housing to which the sensor substrate is secured. Further, a projecting portion that continues in the axial direction is formed in an outer circumferential portion of the stator, a recessed portion that corresponds to the projecting portion is formed in an inner circumferential portion of a housing, at which the motor is contained, in the housing, and the motor is secured inside the housing by an insertion-side opening of the housing being closed with an opening holding member after the motor is contained in the housing.

Advantageous Effects of Invention

According to the disclosure, it is possible to curb increase in size of the housing that contains the sensor substrate. Also, mounting of the sensor substrate in the electrically powered tool using the brushless motor is facilitated.

The aforementioned and other purposes and new features of the disclosure will become apparent from the following description in the specification and drawings.

DESCRIPTION OF EMBODIMENTS

First Embodiment

Figure 1:
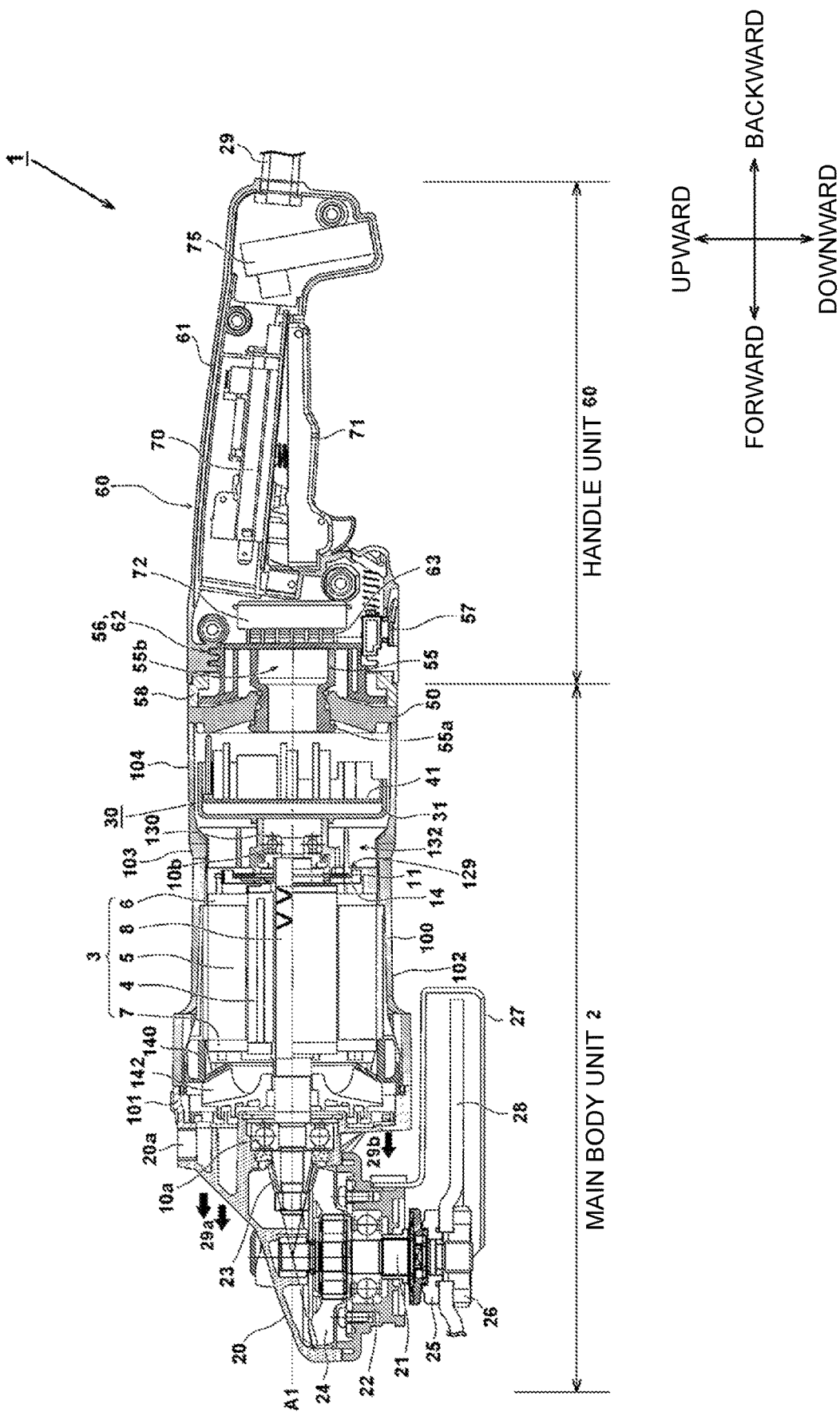
FIG. 1 is a vertical sectional view (partial side view) illustrating an overall configuration of a disc grinder 1 that is an electrically powered tool according to an embodiment of the disclosure.

Hereinafter, embodiments of the disclosure will be described in detail with reference to drawings. Also, the same reference numerals will be given to members with the same functions in all the drawings for explaining the embodiments, and repeated description thereof will be omitted. Further, in this specification, description will be performed assuming that the forward, rearward, left, right, and up and down directions are directions as shown in the drawings.

FIG. 1 is a sectional view (partial side view) illustrating an overall configuration of a disc grinder 1 according to an embodiment of the disclosure. The disc grinder 1 is configured such that a motor 3 that serves as a drive source is contained inside a cylindrical motor housing 100 and a main body unit (electrically powered tool main body) 2 including an operation device (here, a grinder using a whetstone 28 as a tip end tool) driven by the motor 3 and a handle unit 60 that is provided behind the main body unit 2 such that an operator grips the handle unit 60 are included. The disc grinder 1 is configured such that the main body unit 2 and the handle unit 60 can turn (can slide) around a rotation axial line A1 of the motor 3 by a predetermined angle. The handle unit 60 can rotate by 90 degrees on one side and by 90 degrees on the other side from the state illustrated in FIG. 1 about the rotation axial line A1, and the handle unit 60 can be secured to the motor housing 100 in the rotating state. In order to realize turning around the rotation axial line A1, the main body unit 2 and the handle unit 60 are connected to each other via a turning mechanism. The turning mechanism is configured to include an intermediate member 55 that is held on a side of the handle unit 60 and a support member 50 that axially supports the intermediate member 55 such that the intermediate member 5 can turn around the rotation axial line A1.

The main body unit 2 is configured to include a portion that is contained in the cylindrical motor housing 100 and a power transmission mechanism connected to a front side thereof. The motor 3 of a brushless type is contained inside the motor housing 100. The motor 3 is adapted such that a rotor 4 having permanent magnets is disposed on an inner circumferential side, has a stator 5 having a coil on an outer circumferential side, and is contained inside the motor housing 100 from an opening on the front side. A rotational shaft 8 of the motor 3 is held by a bearing 10b provided near the center of the motor housing 100 and a bearing 10a on the front side that is held by a gear case 20 that covers the opening of the motor housing 100 on the front side, such that the rotational shaft 8 can turn. The power transmission mechanism includes a disc-shaped whetstone 28 attached to a spindle 21 that is axially supported at the gear case 20 with a bearing 22 and a wheel guard 27. A pair of bevel gears 23 and 24 are disposed in the gear case 20, and thereby the direction of the rotational force of the rotational shaft 8 of the motor 3 is changed and transmitted to the spindle 21. The whetstone 28 is secured to a lower end of the spindle 21 with a pressing metal tool 26 via a receiving metal tool 25. A side handle attachment hole 20a is provided at an upper portion of the gear case 20, and similar side handle attachment holes (not illustrated) are also provided in a right side surface and a left side surface of the gear case 20.

An inverter circuit unit 30 is inserted into an opening of the motor housing 100 on a rear end side, and the opening portion is then covered with a support member 50 and an intermediate member 55. A plurality of separate members are joined together in the support member 50, and an outer circumferential portion thereof is secured with a rubber damper 58 that is a first elastic body. When separate left and right pieces of the support member 50 are joined, a swing support unit 55a of the intermediate member 55 is sandwiched near the center of the support member 50. A circuit substrate 41 of the inverter circuit unit 30 is a substantially annular multilayer substrate with a diameter that is slightly larger than the outer shape of the motor 3 and is disposed such that the surface thereof is orthogonal to the rotation axial line A1. Since the circuit substrate 41 is disposed such that the circuit substrate 41 is orthogonal to the rotation axial line A1 in this manner, the entire length (the dimension in the forward-backward direction) of the electrically powered tool can be shortened. Six switching elements (which will be described later) such as insulating gate bipolar transistors (IGBT) are mounted on the circuit substrate 41. The circuit substrate 41 on which the switching elements are mounted is disposed inside the motor housing 100 in a state in which the circuit substrate 41 is contained inside a container-shaped cylindrical case 31. The motor housing 100 at a portion at which the inverter circuit unit 30 is contained is formed such that the inner diameter thereof is slightly thicker than the portion at which the motor 3 is contained. The small annular sensor substrate 11 is mounted between the bearing 10b and the stator 5 when seen in the direction of the rotation axial line A1. The sensor substrate 11 has an annular substrate portion, and three Hall ICs 17a to 17c (which will be described later) are mounted thereon at intervals of 60 degrees on side on which the Hall ICs 17a to 17c face the stator 5. The Hall ICs 17a to 17c (which will be described later) detect the position of the rotor 4 by directly detecting a magnetic field generated by the rotor 4. The sensor substrate 11 includes an attachment unit (which will be described later with reference to FIGS. 5 and 6) provided on the side of the motor housing 100 instead of the side of the motor 3 and is fitted into and held by a recessed portion provided at the attachment unit.

A bottom portion 129 that extends inward in the radial direction is provided on an inner side surface of the motor housing 100. The bottom portion 129 has a bearing holder 130, a rib 131, and airflow windows 132, which will be described later. A cooling fan 142 is provided on the side in front of the motor 3 and is between this and the bearing 10a.

The cooling fan 142 is a centrifugal fan, suctions air on the side of the motor 3, and discharges the air outward in the radial direction. An air flow from the rear side to the front side of the motor housing is generated by an air flow caused by the cooling fan 142. First, external air is taken from an air intake hole 63 with a slit shape formed on the side of the handle unit 60, flows through a through-hole and an airflow window (not illustrated in FIG. 1) formed in the intermediate member 55 and the support member 50, and flows from the opening in the motor housing 100 on the rear side into a space inside the motor housing 100. The air flow that has flowed into the space cools electronic components mounted on the inverter circuit unit 30 first, passes through a notch portion on a side of the inverter circuit unit 30, and reaches a portion near the bearing holder 130 through a gap with respect to the motor housing 100 on the outer circumferential side of the cylindrical case 31 of the inverter circuit unit 30. Since the plurality of airflow windows 132 are formed on the outer circumferential side of the bearing holder 130, the air flow reaches the side of the motor 3 through the airflow windows 132.

The air flow that has reached the side of the motor 3 flows such that the air flow passes between the rotor 4 and the stator 5 and between the stator 5 and an inner wall portion of the motor housing 100, is suctioned from a portion near an axial center of the cooling fan 142, flows to the outside of the cooling fan 142 in the radial direction, and passes through an air hole formed on the outer circumferential side of the bearing holder 130. A part of cooling airflow discharged from the bearing holder 130 is discharged to the outside as represented by an arrow 29a via an exhaust port formed (not illustrated) in the gear case 20, and the rest is discharged to the outside as represented by an arrow 29b via an exhaust port (not illustrated) near the lower side of the bearing holder 130. As described above, external air is suctioned from the handle unit 60 using the cooling fan 142, and the air is caused to flow from the rear side to the front side of the motor housing 100. At this time, since the inverter circuit unit 30 that generates the largest amount of heat is disposed on a windward side of the motor 3 (bearing 10b) and at a position at which the inverter circuit unit 30 is most likely to be cooled, it is possible to efficiently cool electronic elements, in particular, a semiconductor switching element mounted on the inverter circuit unit 30. Also, it is possible to axially support the motor 3 in a firmer manner by forming the motor housing 100 as a tubular integrated component than by performing support with a motor housing that can be divided along a section including the axial line and thereby to secure sufficient rigidity.

The handle unit 60 serves as a portion that the operator grips during an operation, and a case body thereof includes a handle housing 61 formed by a left-right dividing method through molding of plastic and is secured with four screws, which are not illustrated. The handle unit 60 can rotate by 90 degrees on one side and by 90 degrees on the other side from the state in FIG. 1 about the rotation axial line A1, and the handle unit 60 can be secured to the motor housing 100 in the rotating state. In order to realize rotation about the rotational axial line A1, the turning mechanism is realized by a rotation rail 56 formed into a rib shape at an outer circumferential edge of the intermediate member 55 on the rear side and a turning groove unit 62 formed in the handle housing 61 being fitted to each other.

A hollow conical (bell-shaped) swing support unit 55a is formed on the front side of the intermediate member 55, and an outer circumferential surface (curved surface portion) of the bell shape is held at the support member 50. The support member 50 and the intermediate member 55 are disposed to realize a vibration restricting mechanism for the handle unit 60, the intermediate member 55 can slightly swing relative to the support member 50, and an elastic body, which will be described later, is disposed within a swinging range. A stopper mechanism 57 for inhibiting rotation of the handle housing 63 about the rotation axial line A1 is provided at an end of the handle housing 61 on the lower front side. The stopper mechanism 57 can move in a direction (forward-backward direction) that is parallel to the rotation axial line A1, and a stopper piece extending backward in the axial direction is engaged with any of recessed portions (not illustrated) formed in the intermediate member 55, thereby fixing the position of the handle unit 60 in the turning direction.

A control circuit unit 72 is contained behind the intermediate member 55. The control circuit unit 72 is sandwiched with the handle housing 61 such that the control circuit unit 72 extends in a direction that is orthogonal to the rotational shaft A1. The control circuit unit 72 contains a control circuit substrate (not illustrated) that serves as a second circuit substrate inside a case with a shallow container shape, and a control circuit (which will be described later) of the motor 3 is mounted thereon. In this manner, it is possible to curb increase in size of the circuit substrate when all circuits are caused to be concentrated on a single substrate and to achieve size reduction of the tool by separating the circuits for the inverter and for control on other substrates (the circuit substrate 41 and a circuit substrate in the control circuit unit 72, which is not illustrated in the drawings).

A power supply cord 29 for supplying commercial AC power is connected to the rear end side of the handle portion 60, and a filter circuit unit 75 on which electrical components for preventing noise are mounted is provided at a position near to the led out power cord 29. A configuration of the filter circuit unit 75 is realized similarly to the configuration of the control circuit unit 72, and a third circuit substrate on which filter circuits such as a choke coil, a discharge resistor, a capacitor, a varistor, and a pattern fuse are mounted is contained in a containing case with a rectangular parallelepiped shape and with an opening in one surface, which is not illustrated in the drawings. A trigger switch 70 for controlling turning the motor 3 ON and OFF is disposed at a central portion of the handle housing 61. The trigger switch 70 switches the motor 3 between ON and OFF by allowing a trigger lever 71 to be operated.

Figure 2:
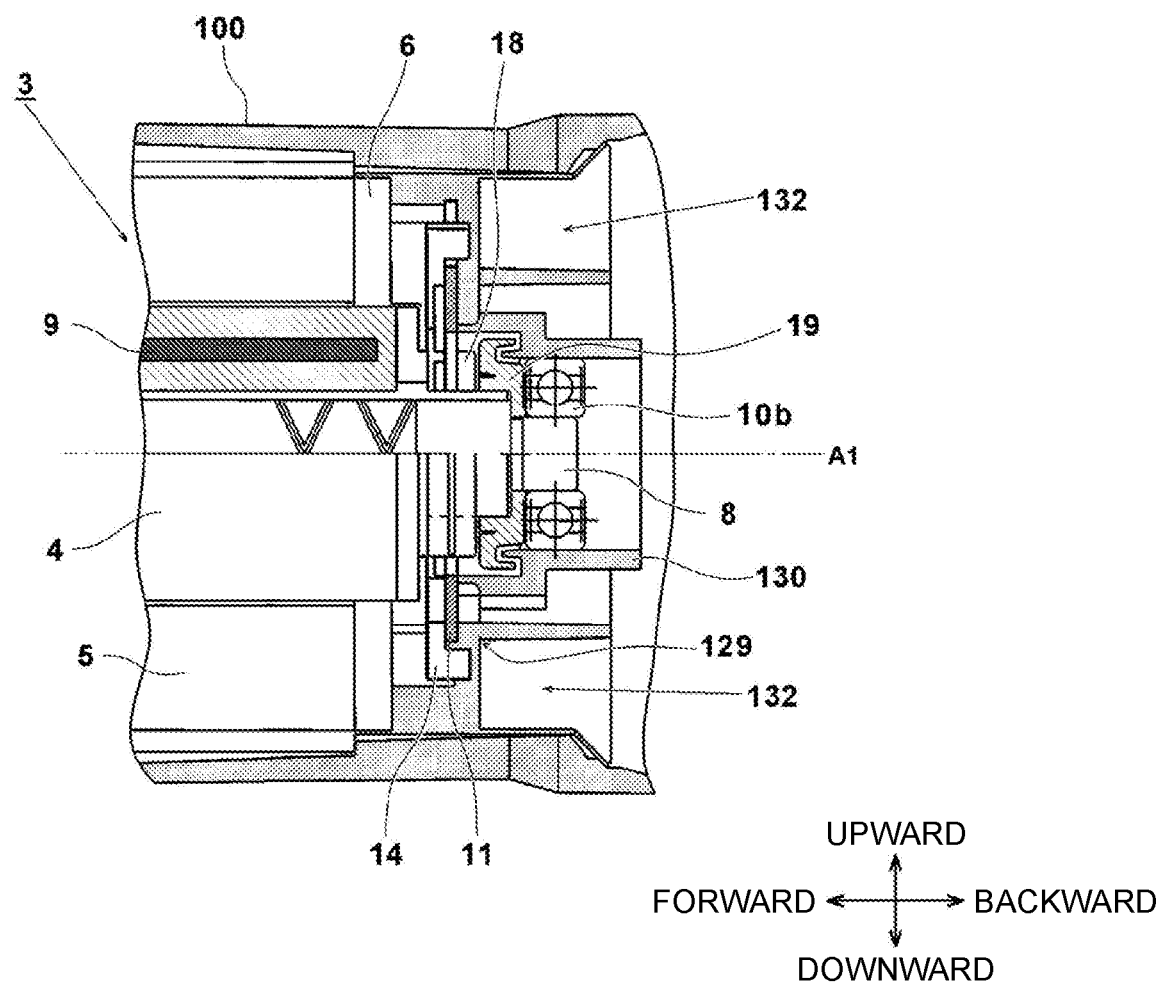
FIG. 2 is a partial enlarged sectional view in the vicinity of a sensor substrate 11 in FIG. 1.

FIG. 2 is a partially enlarged sectional view near the sensor substrate 11 in FIG. 1. The sensor substrate 11 is a disc-shaped print substrate with a through-hole formed at the center thereof, and a rotational shaft 8 of the motor 3 penetrates through the center thereof. A rear end portion of the rotational shaft 8 has a diameter formed to be thin, and the thin diameter portion is axially supported by the bearing 10b. The bearing 10b is a ball bearing, and an outer ring side thereof is held by the bearing holder 130. The bearing holder 130 is a portion manufactured through integral molding with the motor housing 100. Three Hall ICs 17 (which are not seen in FIG. 2), which will be described later, are mounted on the front side of the sensor substrate 11, and a rotational position of the rotor 4 is detected by the Hall ICs directly detecting a change in a magnetic field generated by the permanent magnets 9 disposed inside a core of the rotor 4. That is, since the sensor substrate 11 is adapted to detect the rotational position of the rotor 4 by directly detecting the positions of the permanent magnets 9 used for driving the motor 3, it is not necessary to separately provide a sensor magnet for detecting the rotational position of the rotor 4 in the embodiment, which makes it possible to realize cost reduction and size reduction. A disc-shaped insulator 18 made of a synthetic resin is interposed on the rear side of the sensor substrate 11. A cap member 19 made of a synthetic resin for realizing a labyrinth mechanism is provided between the insulator 18 and the bearing 10b. A cover member 14 made of a synthetic resin covers a portion on the front side of the sensor substrate 11, which faces the rotor 4 and the stator 5. The shape of the cover member 14 will be described later with reference to FIGS. 5 and 6.

Figure 3:
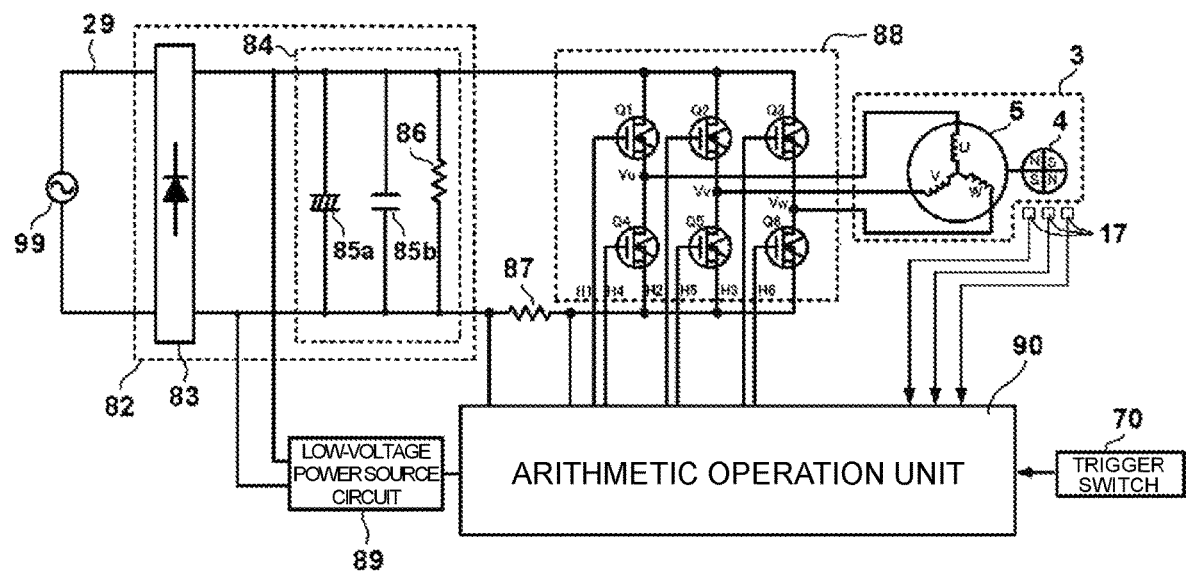
FIG. 3 is a circuit configuration diagram of a drive control system of the disc grinder 1 in FIG. 1.

Next, a main circuit configuration of a drive control system of the motor 3 will be described with reference to FIG. 3. A rectifier circuit 82 includes a rectifier circuit that is formed using a bridge diode 83 and the like. Although the trigger switch 70 (see FIG. 1) and the filter circuit unit 75 are mounted on the circuit from the commercial AC power source 99 to the bridge diode 83, illustration thereof is omitted here. A smoothing circuit 84 is connected on an output side of the rectifier circuit 82 and between the bridge diode 83 and the inverter circuit 88. The inverter circuit 88 is configured to include six switching elements Q1 to Q6, and switching operations are controlled with gate signals H1 to H6 supplied from an arithmetic operation unit 90. Outputs of the inverter circuit 88 are connected to a U phase, a V phase, and a W phase of the coils of the motor 3. A low-voltage power source circuit 89 is connected on the output side of the bridge diode 83. The low-voltage power source circuit 89 is a known power source circuit that supplies a stable DC reference voltage (low voltage) for the arithmetic operation unit 90 to operate.

The bridge diode 83 performs full wave rectification on an AC current input from the commercial AC power source 99 and outputs the AC current to the smoothing circuit 84. The smoothing circuit 84 smoothes a pulsating current included in the current rectified by the bridge diode 83 into a state close to a DC current and outputs the pulsating current to the inverter circuit 88. The smoothing circuit 84 is configured to include an electrolytic capacitor 85a, a capacitor 85b, and a discharge resistor 86. The inverter circuit 88 is configured to include six switching elements Q1 to Q6 connected in a three-phase bridge form. Here, although IGBTs are used as the switching elements Q1 to Q6, FETs may be use instead.

The rotor 4 having the permanent magnets rotates inside the stator 5 of the motor 3. Rotational position detecting elements using three Hall ICs 17 (17a to 17c) are provided in the vicinity of the rotor 4, and the arithmetic operation unit 90 detects the rotational position of the rotor 4 by monitoring an output of the rotor 4. The sensor substrate 11 (see FIG. 2) on which the Hall ICs 17 are mounted is disposed at a position at which the sensor substrate 11 faces an end surface of the rotor 4 on one side.

The arithmetic operation unit 90 is a control unit for controlling ON and OFF and rotation of the motor and is configured using mainly a microcomputer (hereinafter, referred to as an "MC"), which is not illustrated. The arithmetic operation unit 90 is mounted on a circuit substrate (which is not illustrated) of the control circuit unit 72 and controls an electrification time and a drive voltage to the coils U, V, and W for rotating the motor 3 on the basis of an activation signal input with an operation of the trigger switch 70. Also, although not illustrated herein, a transmission dial for setting a rotation speed of the motor 3 may be provided, and the arithmetic operation unit 90 may adjust the speed of the motor 3 in accordance with the speed set by the transmission dial. An output of the arithmetic operation unit 90 is connected to each of gates of the six switching elements Q1 to Q6 of the inverter circuit 88.

The respective emitters or collectors of the six switching elements Q1 to Q6 of the inverter circuit 88 are connected to the coils in the U phase, the V phase, and the W phase in star connection. The switching elements Q1 to Q6 perform switching operations on the basis of gate signals H1 to H6 input from the arithmetic operation unit 90 and supply the DC voltages supplied from the commercial AC power source 99 via the rectifier circuit 82 as voltages Vu, Vv, and Vw in three phases (the U phase, the V phase, and the W phase) to the motor 3. The magnitudes of currents supplied to the motor 3 are detected by the arithmetic operation unit 90 by detecting voltage values at both ends of the shunt resistor 87 connected between the smoothing circuit 84 and the inverter circuit 88.

Figure 4:
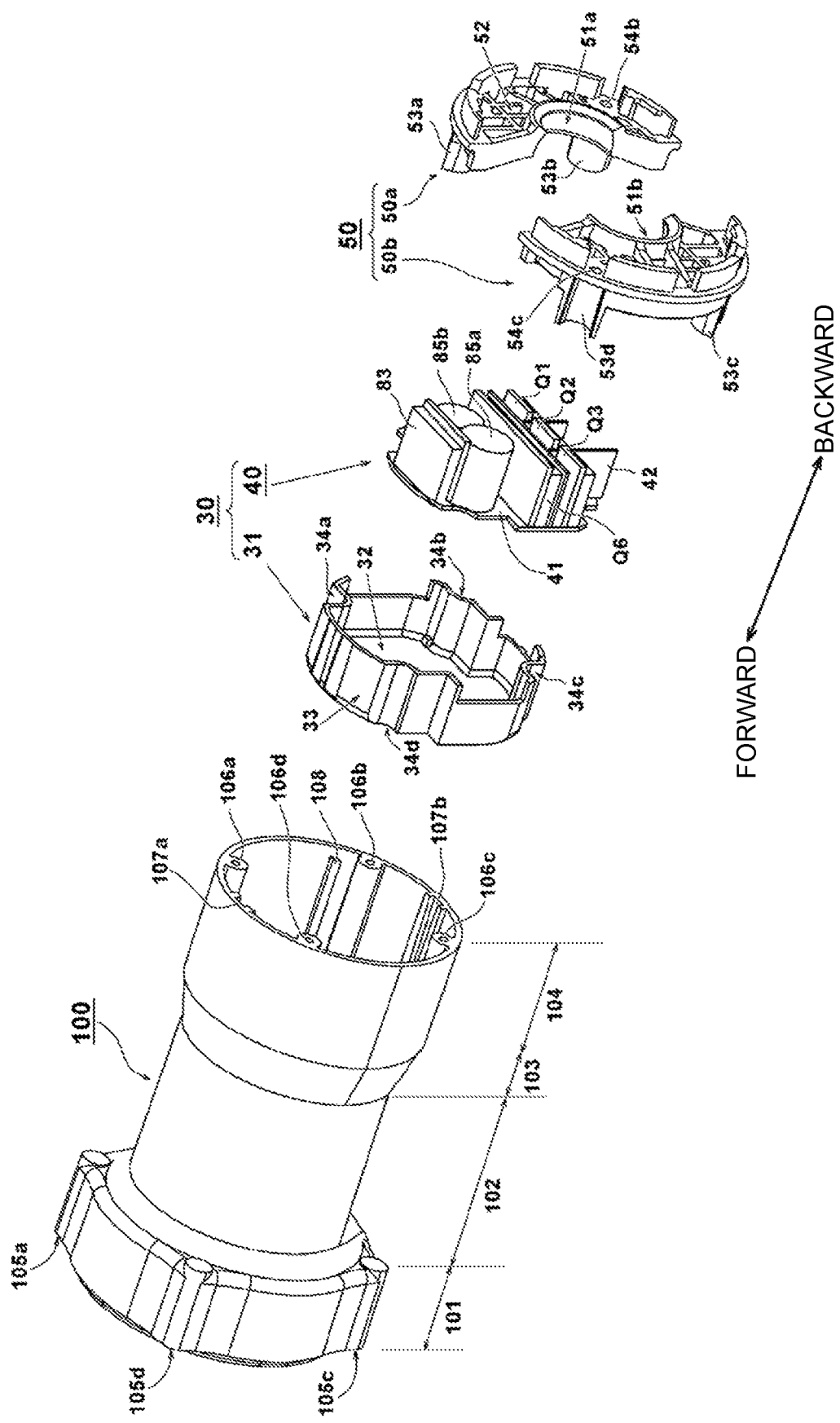
FIG. 4 is an exploded perspective view illustrating a situation in which an inverter circuit unit 30 attached to a motor housing 100 in FIG. 1 on a rear side is mounted.

Next, internal structures of the motor housing 100 and the inverter circuit unit 30 contained behind the motor housing 100 will be described with reference to the exploded diagram in FIG. 4. The motor housing 100 is manufactured through integral molding of a synthetic resin, and a fan containing unit 101 with an outer diameter formed to be large is formed on the front side of the motor containing unit 102 that contains the motor 3. An outer diameter of the fan containing unit 101 is formed to be large in order to contain the cooling fan 142 (see FIG. 1) therein, and screw boss units 105a to 105d (however, 105b is not seen in the drawing) for securing the gear case 20 (see FIG. 1) with screws are formed at four locations in an outer circumference thereof. The circuit substrate containing unit 104 with a large diameter for containing the inverter circuit unit 30 is formed near a rear opening of the motor housing 100. Here, the diameter of the circuit substrate containing unit 104 is formed to be large relative to the diameter of the motor containing unit 102. Therefore, a connecting portion from the motor containing unit 102 to the circuit substrate containing unit 104 is a tapered portion 103 that spreads in a tapered manner. The bearing holder 130 that serves as a portion for holding the bearing 10b and the airflow windows 132 (see FIG. 1) are formed at an inner portion of the tapered portion 103.

The inverter circuit unit 30 is formed using an IGBT circuit element group 40 that are electronic components mounted on the circuit substrate 41 and a container-shaped cylindrical case 31 for containing the IGBT circuit element group 40. The cylindrical case 31 is obtained by blocking one side (front side) of a substantially cylindrical outer circumferential surface 33 with a bottom surface 32, and the IGBT circuit element group 40 is contained in the inner space thereof. It is possible to mount the switching elements at portions near the motor 3 and to shorten a wiring from the circuit substrate 41 to the motor 3 by disposing the switching element group for driving the motor inside the cylindrical case 31 in this manner. Also, it is possible to manufacture the inverter circuit unit 30 and to assemble the inverter circuit unit 30 with the motor housing 100 independently from assembling of the motor 3 with the motor housing 100, thereby enabling efficient assembly, and to curb an increase in size of the electrically powered tool by omitting an unnecessary space for disposing wiring. The cylindrical case 31 is disposed such that the opening side corresponds to the side of the handle unit 60 (directed to the rear side), that is, an air inhalation side and such that the bottom surface 32 that serves as a closing surface is disposed on the side of the motor 3 (directed to the front side).

If the inverter circuit unit 30 is contained inside the circuit substrate containing unit 104 behind the motor housing 100, the support member 50 is attached thereto from the rear side. The support member 50 supports the intermediate member 55 (see FIG. 1) in a state in which the intermediate member 55 can slightly slide relative to the support member 50. Through-holes 51a and 51b are formed near the central axis of the support member 50, and the slide support unit 55a (see FIG. 1) formed at the intermediate member 55 (see FIG. 1) and having a diameter increasing in a cone shape is sandwiched therebetween. The support member 50 is secured to an opening portion of the motor housing 100 on the rear side with screws, which are not illustrated, using four screw holes 54a to 54d (the screw holes 54a and 54c are not seen in FIG. 4) in a state in which a right portion 50a and a left portion 50b are joined to each other.

Screw bosses 106a to 106d with holes formed to allow screws penetrate therethrough are formed at an opening portion of the motor housing 100 on the rear side. Also, rail units 108a and 108b (108b is not seen in the drawing) extending in the axial direction for holding the outer circumferential surface of the cylindrical case 31 are formed in the vicinity of the screw bosses 106a to 106d. Semi-cylindrical pressing members 53a to 53d extending forward are formed at portions, through which the screws penetrate, at the outer circumferential portion of the support member 50. The pressing members 53a to 53d abut cylindrical outer circumferential surfaces of the screw bosses 106a to 106d on the side of the motor housing 100 and hold a part of an opening edge of the cylindrical case 31 on the rear side. A plurality of airflow windows 52 for allowing an airflow to flow in the axial direction are formed with a net configuration on the outside of the through-holes 51a and 51b in the radial direction.

A recess that continues in the axial direction in a shape along the inner shape of the circuit substrate containing unit 104 of the motor housing 100 is formed in the outer circumferential shape of the cylindrical case 31. Turning prevention holding units 34a to 34d are portions recessed in order to avoid the cylindrical screw bosses 106a to 106d of the motor housing 100. Portions on both left and right sides of the cylindrical case 31 act as airflow paths that allow cooling airflow that has flowed from the rear side of the support member 50 in the axial direction and has been brought into contact with a portion near the IGBTs to flow to the side of the motor 3.

Main electronic components mounted on the circuit substrate 41 are six semiconductor switching elements Q1 to Q6 (Q4 and Q5 are not seen in the drawing). Independent heat discharge plates made of metal are attached to the switching elements Q1 to Q3 and are disposed such that surface directions thereof extend in the left-right direction and the forward-backward direction, that is, such that the heat discharge plates are parallel to a flowing direction of the cooling airflow. The three switching elements Q4 to Q6 (Q4 and Q5 are not seen in the drawing) are disposed above the switching elements Q1 to Q3 such that the surface directions thereof extend in the left-right direction and the forward-backward direction. Since emitter terminals of these switching elements Q4 to Q6 are commonly grounded, a common metal heat discharge plate that is long in the left-right direction is provided. The switching elements Q1, Q2, Q3, and Q4 to A6 are blocked by a partitioning plate 42 that is a non-conductive member. The bridge diode 83 is provided above the circuit substrate 41. Two capacitors 85a and 85b are mounted at a portion below the bridge diode 83. A terminal for soldering a power line connected from the trigger switch 70, a terminal (not illustrated) for soldering a power line for delivering drive power in the U phase, the V phase, and the W phase to the motor 3, and a connector terminal (not illustrated) of a wire harness for connection to the control circuit unit 72 are provided on the circuit substrate 41. The power line connected to the motor 3 is wired to the coils of the stator 5 (see FIG. 1) via a space created between the recessed portion in the outer circumferential portion of the cylindrical case 31 and an inner wall surface of the motor housing 100.

Figure 5:
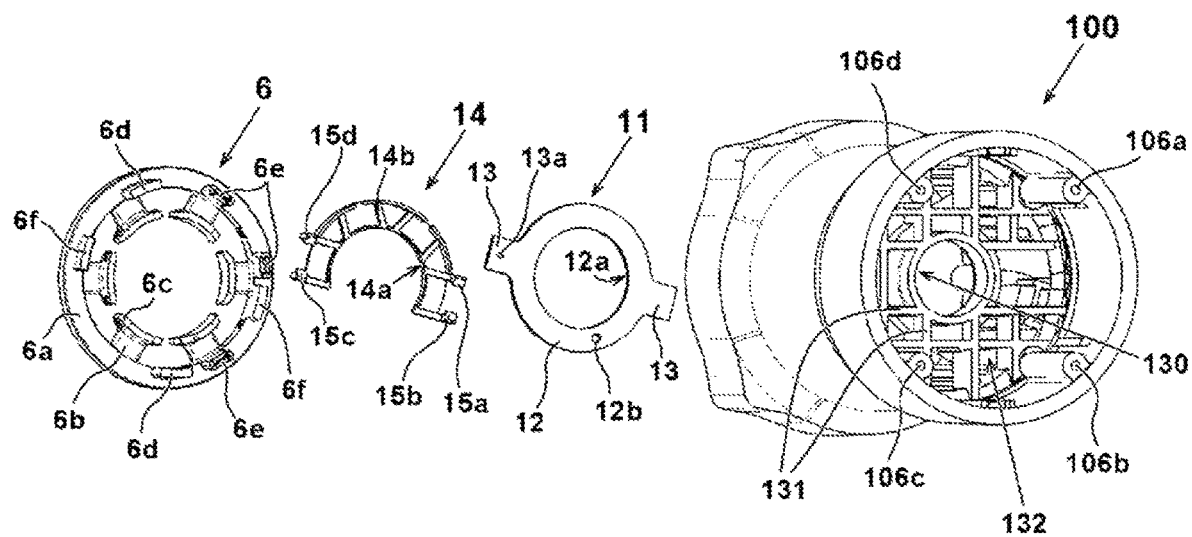
FIG. 5 is a perspective view illustrating shapes of the sensor substrate 11 and a cover member 14 attached to the motor housing 100 in FIG. 1 from a side in front (a view when seen from behind).

FIG. 5 is a perspective view (a view when seen from the rear side) illustrating shapes of the sensor substrate 11 and the cover member 14 attached to the motor housing 100 from the front side. As illustrated in FIG. 4, the inverter circuit unit 30 is contained in the motor housing 100 behind the motor housing 100 and is secured by the support member 50. These inverter circuit unit 30 and the support member 50 are inserted forward in the direction of the rotation axial line A1 from the rear side of the motor housing 100. Meanwhile, the motor 3 is inserted backward in the direction of the rotation axial line A1 from the front side of the motor housing 100. Before the motor 3 is inserted, the sensor substrate 11 on which the three Hall ICs 17 (not illustrated) are mounted is attached to the motor housing 100. The cover member 14 for covering a surface corresponding to a substantially half or more of the sensor substrate 11 is attached to the front side of the sensor substrate 11. In the insulator 6 illustrated in FIG. 5, a component attached to an end of the stator 5 of the motor 3 is illustrated. If the motor 3 is inserted up to a predetermined position at which the motor 3 is brought into contact with the motor housing 100, the sensor substrate 11 is brought into a sandwiched state in which the sensor substrate 11 is sandwiched between the motor housing 100 and the motor 3 by the insulator 6 located at the rear end of the stator 5 and made of a synthetic resin pressing the sensor substrate 11 backward, and the sensor substrate 11 is stably held by the motor housing 100. That is, a surface on one side that faces the motor 3 of the surface (front surface) on the one side and a surface on the other side (rear surface) of the sensor substrate 11 in the rotational shaft direction of the motor 3 abuts a part of the insulator 6 at which the stator 5 is provided, and the surface on the other side that faces the handle housing 61 abuts the bottom portion 129 that corresponds to a part of the motor housing 100, thereby holding the sensor substrate 11 such that the position thereof in the forward-backward direction is fixed. In this manner, since there is no need to prepare a special securing tool, a screw boss, and the like for securing the sensor substrate 11, it is possible to reduce the sizes of the sensor substrate 11 and the motor housing 100 according to the disclosure. A lead line extending from the sensor substrate 11, which is not illustrated in the drawing, is arranged on the rear side through the airflow windows 132 of the motor housing 100 and is then connected to the control circuit unit 72.

The sensor substrate 11 is a print substrate on which a circuit pattern is printed, has an annular portion 12 formed into an annular shape, and has an extending portion 13 formed outside the annular portion 12. A purpose of the sensor substrate 11 is to mounting the three Hall ICs 17 at intervals of 60 degrees around the rotation axial line A1, and it is sufficient for the annular portion 12 to have a length of equal to or more than a halfway round. However, the sensor substrate 11 is formed into an annular shape on the basis of a relationship in which the sensor substrate 11 is stably held by the sandwiched state between the motor housing 100 and the motor 3 in the embodiment. Also, since the extending unit 13 is formed into a rotationally symmetric shape extending outward in the radial direction from two locations separated at an angle of 180 degrees in the rotation direction of the rotor 4 at the outer circumferential portion of the annular portion 12, it is possible to hold the sensor substrate such that the sensor substrate does not rotate about the axis of the rotor 4 by causing the extending portion 13 to fit to the recessed portions 133 and 134 (which will be described later with reference to FIGS. 6 and 7) that serve as attachment base units formed in the motor housing 100. Two positioning through-holes 12b and 13a are formed in the sensor substrate 11. Here, it is possible to precisely attach the sensor substrate 11 by causing positioning projections 121a and 121b (which will be described later with reference to FIG. 7) formed at the bottom portion 129 of the motor housing 100 to penetrate through the two through-holes 12b and 13a.

The cover member 14 is for protecting the printed circuit pattern on the sensor substrate 11 that is a covering member made of a synthetic resin and electronic elements (here, the Hall ICs 17 and the like) mounted thereon. Therefore, it is only necessary for the cover member 14 to have a size sufficient to cover the protection target portion, and the cover member 14 is formed into a semi-annular shape that is larger than the halfway round in the circumferential direction here. Although a method by which the cover member 14 is secured to the sensor substrate 11 is an arbitrarily decided, four claw portions 15a to 15d are formed near an outer edge of the cover member 14, and the sensor substrate 11 is hooked with the claw portions 15a to 15d, thereby enabling attachment of the cover member 14 without any need to prepare a securing member such as a screw in this case. The cover member 14 is a protector for preventing dust flowing with the cooling airflow from being brought into contact with the Hall ICs mounted on the sensor substrate 11. Therefore, the cover member 14 is preferably manufactured using a non-conductive material, and here, the cover member 14 is formed into a plat plate shape as a molded article made of a synthetic resin. Also, a plurality of ribs 16 extending in the radial direction are formed in the cover member 14 on the side of the sensor substrate 11 such that the ribs 16 satisfactorily abut on the sensor substrate 11 side. The ribs 16 are disposed at positions at which the ribs 16 do not interfere with the positions at which the Hall ICs 17 are mounted, secure tightness between the cover member 14 and the sensor substrate 11, prevents the Hall ICs 17 from being brought into contact with the cover member 14, and further enhances rigidity of the cover member 14.

The insulator 6 is provided at the core of the stator 5 formed by a layered iron core on the rear end side and serves as a part of a winding portion of a bobbin around which coils are wound. A projection shape of the insulator 6 when seen in the axial direction of the rotational shaft A1 is assumed to be the same as a projection shape of the stator 5. Therefore, a plurality of winding portions 6b extending on the inner circumferential side from the annular portion 6a are formed at the insulator 6, and teeth portions 6c extending in the circumferential direction are formed on the innermost circumferential side of the winding portions 6b. A plurality of projecting portions 6d and 6f projecting in the axial direction are formed at the annular portion 6a. The projecting portion 6f is a portion that abuts the extending portion 13 of the sensor substrate 11. The projecting portion 6d serves as an abutting portion that positions the motor 3 in the axial direction and decides the rear position of the motor 3 in the axial direction by the projecting portion 6d abutting a coupling portion between the rib 131 an the outer circumferential wall on the outer circumferential side beyond the bearing holder 130 of the motor housing 100. Three terminal holding portions 6e that hold electrodes soldered to ends of the coils wound around the stator 5 are further formed at the insulator 6.

Figure 6:
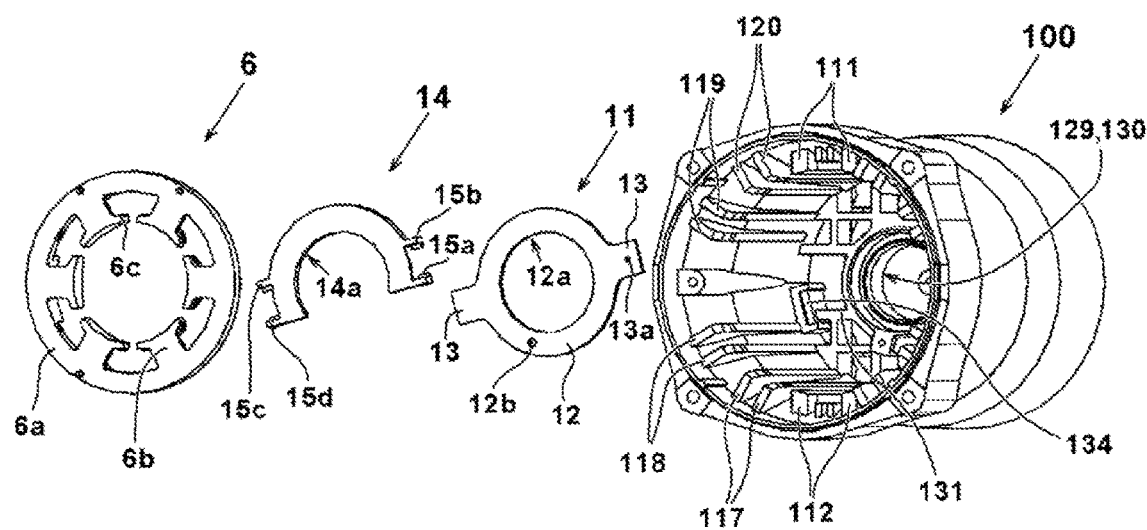
FIG. 6 is a perspective view illustrating shapes of the sensor substrate 11 and the cover member 14 attached to the motor housing 100 in FIG. 1 from the front side (a view when seen from the front side).

FIG. 6 is a perspective view when the sensor substrate 11 and the cover member 14 attached to the motor housing 100 from the front side are seen. The bearing holder 130 for holding the bearing 10b is formed at a portion of the motor housing 100 that is close to the rotation axial line A1. A plurality of ribs extending in the axial direction for holding the outer circumferential surface of the motor 3 are formed inside the motor housing 100 (details will be described later with reference to FIG. 7). Also, ribs 111 and 112 that form recessed portions for preventing the stator 5 from rotating about the direction of the rotational shaft A1 are formed inside the motor housing 100. Further, a plurality of ribs 117 to 120 that continue in the axial direction for holding the motor 3 by abutting the outer circumferential surface of the stator 5 are formed in the inner circumferential surface of the motor housing 100. A recessed portion 134 for positioning the sensor substrate 11 is formed at a portion near the coupling portion to the rib 131 near the rear side of the rib 118. A recessed portion 133 (which is not seen in FIG. 6) is further provided at a rotationally symmetric position with the recessed portion 134. Here, step differences recessed in the axial direction are formed at the depressed portions of the recessed portions 133 and 134, and the step differences are integrally formed through molding when the motor housing 100 is manufactured. By supporting the stator 5 (motor 3) with the motor housing 100 molded to have an integral tubular shape in this manner, it is possible to firmly hold the stator 5 (motor 3) as compared with a case of a motor housing of a divided type and to be compatible with a high output of the motor 3. Since the stator 5 is formed by a layered iron core, has a large specific weight, and has a large total weight, in particular, it is preferable to form the motor housing 100 through the integral molding in terms of strength.

Figure 7:
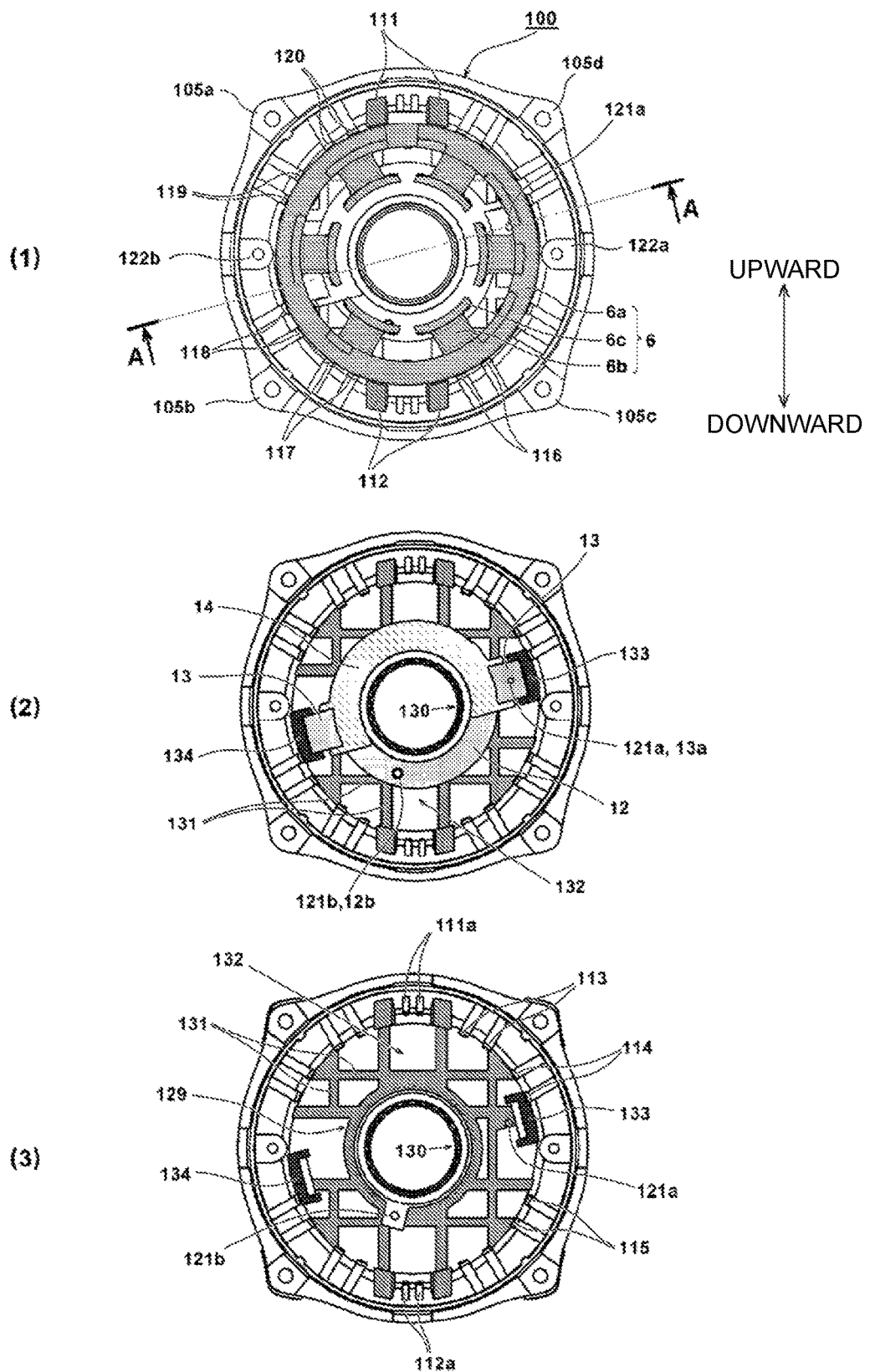
FIG. 7 is a front view of the motor housing 100 in FIG. 1, where (1) illustrates a state in which an insulator 6, the cover member 14, and the sensor substrate 11 have been attached, (2) illustrates a state in which the insulator 6 has been detached from (1), and (3) illustrates a state in which the cover member 14 and the sensor substrate 11 have been detached from (2).

FIG. 7 is a front view of the motor housing 100, where (1) illustrates a state in which the insulator 6, the cover member 14, and the sensor substrate 11 have been attached, (2) illustrates a state in which the insulator 6 has been detached from (1), and (3) illustrates a state in which the cover member 14 and the sensor substrate 11 have been detached from (2). Also, although hatched lines are partially illustrated in FIGS. 7A to 7C for clearly showing ranges of the respective parts, these are not intended to illustrate sections and illustrate parts that can be seen from the outside (from the front side in the axial direction) with different colors.

The state in (1) of FIG. 7 is a state in which the three components illustrated in FIGS. 5 and 6, that is, the insulator 6, the cover member 14, and the sensor substrate 11 have been attached and is a diagram when seen from the front side in the axial direction. Also, it is not possible to separate the insulator 6 from the stator 5 in an actual state in which the coils are wound in the motor 3, and attachment of the insulator 6 means mounting of the entire motor 3 inside the motor housing 100. Here, illustration of the coil portion is further omitted. The insulator 6 is formed of a non-conductive member such as a synthetic resin, a cylindrical portion is formed on the outer circumferential side, and six winding portions 6b project inward. The tip end sides of the winding portions 6b serve as the teeth portions 6c extending in the circumferential direction. The shape of the winding portions 6b and the teeth portions 6c when seen in the axial direction is the same shape as the sectional shape of the stator 5 made of a layered iron core, and an outer diameter thereof is also set to the same diameter as that of the stator 5. Two insulators 7 are provided at the stator 5 of the motor 3 on the front side and the rear side in the axial direction, and six coils are wound between these insulators 6 and 7 so as to surround a magnetic pole of the stator core. The motor 3 is stably held in the motor housing 100 without causing rattling by the outer circumferential surface of the motor 3 being brought into close contact with the plurality of holding ribs 113 to 120 (see (3) for 113 to 115) that are formed on the inner circumferential side of the motor housing 100 and continues in the axial direction. Each of ribs 113 to 120 has two projections. Large ribs 111 and 112 that contain two keys 5a and 5b (which will be described later with reference to FIG. 9) projecting upward and downward relative to the stator 5 are formed at portions above and below the motor housing 100. Also, small ribs 111a and 112a (see (3)) for holding the outer circumferential surfaces of the keys 5a and 5b are further formed at a portion between the ribs 111 and 112 at which the keys 5a and 5b are located.

(2) of FIG. 7 is a diagram illustrating a state in which the insulator 6 has been detached from the state in (1), that is, a state in which the motor 3 has been detached. As can be understood from this drawing, the sensor substrate 11 including the annular portion 12 and the extending portion 13 and the cover member 14 thereof are held on the side of the motor housing 100 instead of the side of the motor 3. The recessed portions 133 and 134 for holding the sensor substrate 11 are formed at two locations on the inner circumferential side of the motor housing 100, and the extending portion 13 of the sensor substrate 11 is fitted to the recessed portions 133 and 134. Although the sensor substrate 11 can be held merely with this state, the through-holes 12a and 12b are formed in the sensor substrate 11, and the sensor substrate 11 are caused to be more firmly held on the side of the motor housing 100 by causing the projections 121a and 121b to penetrate through the through-holes 12a and 12b, respectively. The projection 121a (121b) and the through-hole 12a (12b) that serve as securing members for the sensor substrate 11 are configured to be located on the outer side beyond the bearing 10b, respectively, in the radial direction and located on the inner side beyond the outer circumference of the insulator 6. This positional relationship makes it possible to secure the sensor substrate 11 that is smaller than the outer circumference of the insulator 6 to the motor housing 100. Also, although the diameter of the through-hole 12b is assumed to be substantially the same as the outer diameter of the projection 121b, the projection 121b may be press-fitted into the through-hole 12b by forming the through-hole 12b to have a diameter that is smaller than the outer diameter of the projection 121b. In this manner, it is possible to amplify a fixing force in the axial direction with respect to the sensor substrate 11. Also, screwing may be performed by causing a screw to pass through the through-hole 12b instead of the holding by causing the projection 121b to penetrate through the through-hole 12b. It is possible to similarly obtain a fixing force in the circumferential direction and the axial direction with respect to the sensor substrate 11 through the screwing. In this manner, since even the sensor substrate that is smaller than the outer diameter of the insulator 6 (annular portion 6a), in particular, can be stably secured to the motor housing 100, it is possible to cause the sensor substrate 11 to sufficiently approach the motor 3 and to improve precision for detecting the rotational position of the rotor 4 according to the disclosure.

The cover member 14 is secured by the claw portions 15a to 15d for latching on both sides of the extending portion 13 of the sensor substrate 11 in the circumferential direction being hooked at the extending portion 13. A main purpose of the cover member 14 is to prevent foreign matters, dust, and the like from being brought into contact with and damaging the three Hall ICs 17 (not illustrated) attached to the sensor substrate 11 and a circuit pattern in the circumference thereof. In particular, since the sensor substrate 11 according to the embodiment is in contact with the insulator 6, the distance between the sensor substrate 11 and the motor 3 becomes short, and the cover member 14 is disposed on the side on which the cover member 14 faces the motor 3 in order to curb contact of the dust and the like returned due to rotation of the rotor 4 with the sensor substrate 11 (Hall ICs 17 and the like). Since it is only necessary for the size of the cover member 14 to be large enough to cover the three Hall ICs 17 (not illustrated) and the circuit pattern in the circumference thereof, it is not always necessary to cover the entire circumference of the sensor substrate 11. Also, it will be possible to understand that since the airflow windows 132 between the ribs 131 in a grid shape are sufficiently exposed even in a state in which the sensor substrate 11 and the cover member 14 are attached, the cooling win flows from the rear side to the front side.

(3) of FIG. 7 is a diagram illustrating a state in which the cover member 14 and the sensor substrate 11 have been detached from the state in (2) of FIG. 7. The bottom portion 129 extending inward from the inner circumferential surface of the motor housing 100 is formed at the integrated motor housing 100 that is not divided through a section passing through the axial line, and the cylindrical bearing holder 130 for holding the bearing 10b is formed at the central portion of the bottom portion 129. The plurality of ribs 131 are formed in a grid shape with the ribs 131 interposed with the inner wall of the motor housing 100 for supporting the bearing holder 130. The ribs 131 are support walls disposed so as to be parallel to the rotational shaft A1, and portions therebetween serve as the airflow windows 132. That is, the bottom portion 129 has the bearing holder 130, the plurality of ribs 131, and the airflow windows 132. By the ribs 131 being formed in the grid shape by the plate-shaped portions extending in the upward-downward and left-right directions, it is possible to significantly enhance the strength of the tubular integrated motor housing 100. A projection 121a that is caused to penetrate through the through-hole 12a in the sensor substrate 11 is formed at a rib 131 located in the vicinity of the recessed portion 133. Also, a projection 121b that is caused to penetrate through the through-hole 12b in the sensor substrate 11 is formed at one location at an outer circumferential portion of the bearing holder 130.

Figure 8:
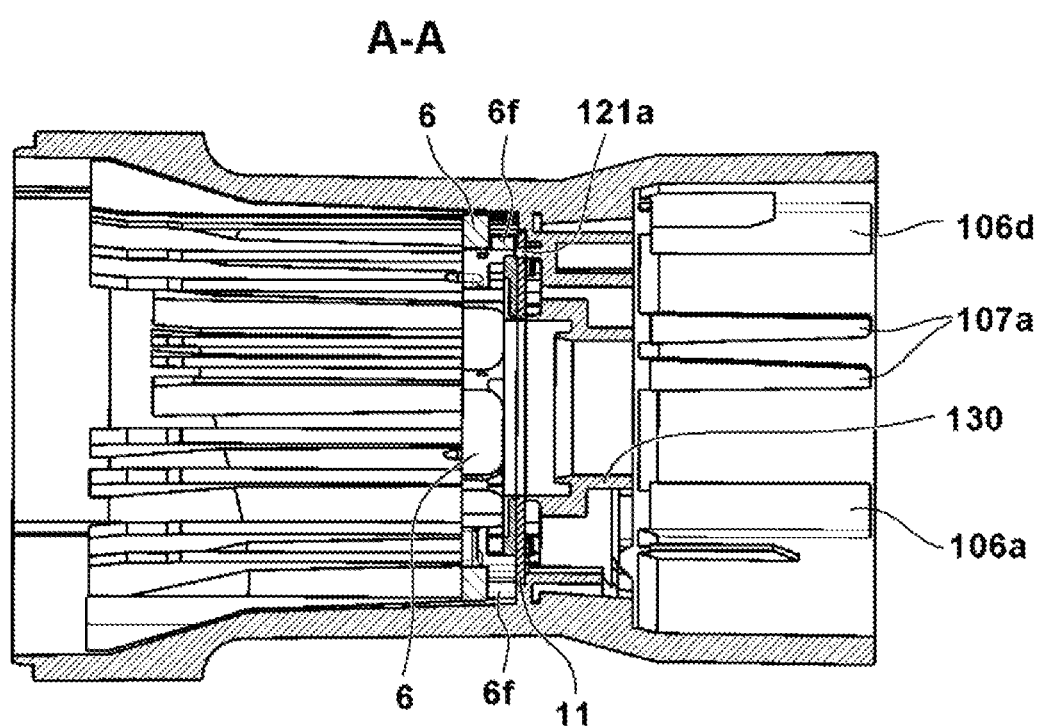
FIG. 8 is a sectional view of the A-A part in FIG. 7A.

FIG. 8 is a sectional view of the portion A-A in (1) of FIG. 7. Here, the state illustrated in (1) of FIG. 7, that is, the state in which the sensor substrate 11, the cover member 14, and the motor 3 have been attached to the motor housing 100 is illustrated. However, only a portion of the insulator 6 is illustrated as the motor 3. In this state, the two projecting portions 6f of the insulator 6 abuts the front side of the extending portion 13 (see FIG. 7) of the sensor substrate 11. As a result, the extending portion 13 of the sensor substrate is sandwiched between the projecting portions 6f and the motor housing 100. Also, since the positioning projection 121b is formed in a region in which the extending portion 13 (see FIG. 7) abuts the motor housing 100, that is, at the recessed portion 134 (see (3) of FIG. 7), it is possible to further precisely position the sensor substrate 11 by positioning the through-hole 13a of the sensor substrate 11 at the location, and to hold the sensor substrate 11 such that the sensor substrate 11 does not move in the rotational direction due to vibration, impact, and the like when the electrically powered tool is used after the motor 3 is assembled. A space for containing the inverter circuit unit 30 is provided behind the bearing holder 130, and the groove portion 107a, the screw bosses 106a and 106d, and the like are formed in the inner circumferential surface.

Figure 9:
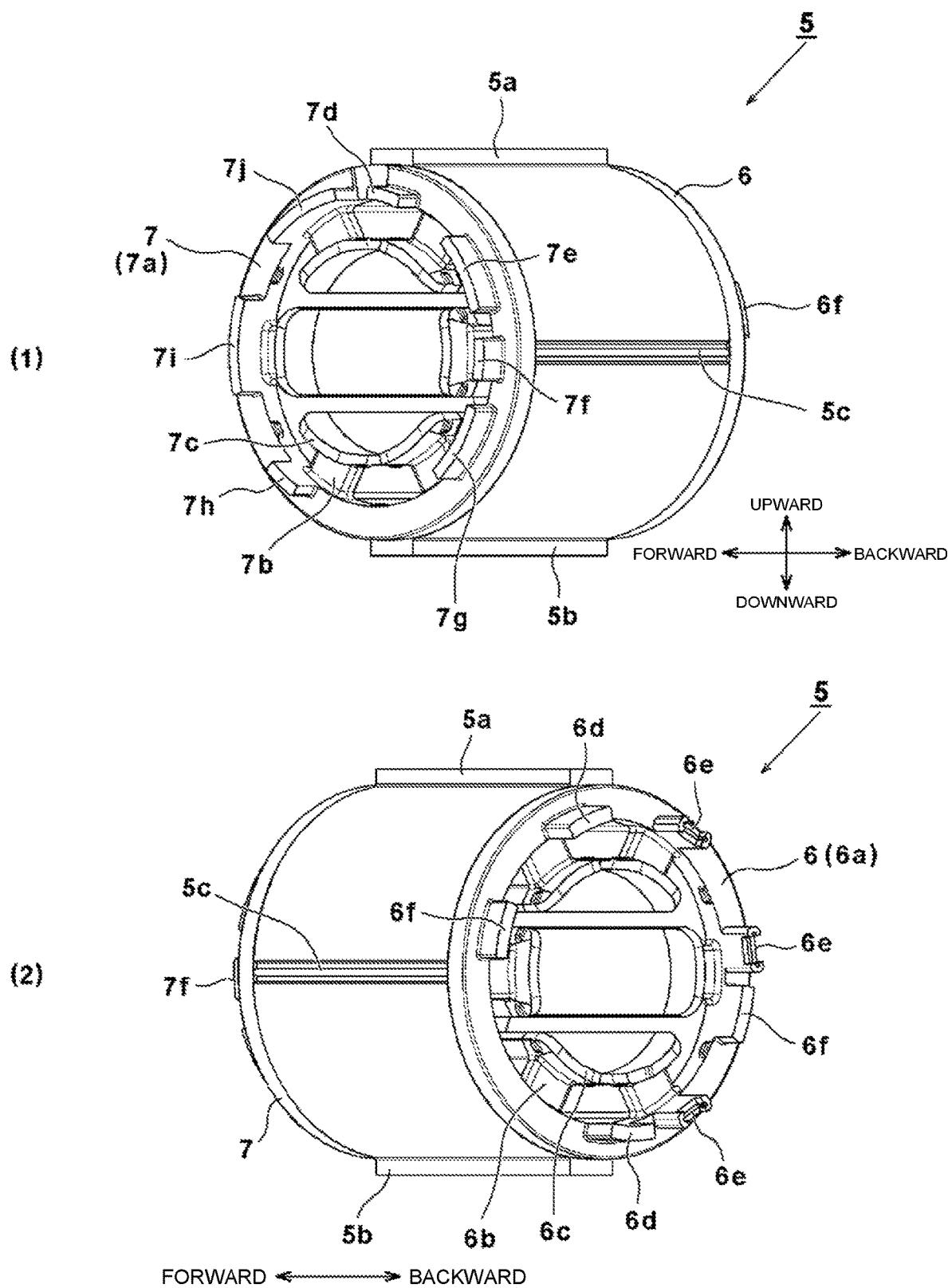
FIG. 9 is an appearance perspective view illustrating a shape of a stator 5 in FIG. 1, where (1) is a view when seen obliquely from a side in front, and (2) is a view when seen obliquely from a side to the rear.

FIG. 9 is an appearance perspective view illustrating the shape of the stator 5, where (1) is a diagram when seen from the obliquely front side, and (2) is a diagram when seen from the obliquely rear side. The stator 5 is configured by non-magnetic insulators 6 and 7 being attached to both ends of a magnetic path portion formed by a layered iron core in the axial direction. Keys 5a and 5b that project outward in the radial direction, continues in the axial direction, and serve as convex portions are formed in the outer circumferential surface of the stator 5. The winding portions 6b and 7b projecting so as to extend inward in the radial direction from the annular portions 6a and 7a on the outer circumferential side are formed at the insulators 6 and 7, and the teeth portions 6c and 7c are formed on the innermost circumferential side of the winding portions 6b and 7b. In regard to the coils (not illustrated) of the motor 3, copper wires are wound a plurality of times from the winding portion 7b on the front side up to the winding portion 6b on the rear side. The six sets of coils wound and formed are connected to each other through star connection or delta connection. A plurality of projecting portions 7d to 7j extending forward in the axial direction are formed in the annular portion 7a of the insulator 7. The projecting portions 7d to 7j serve as guides when the coils are wound.

(2) of FIG. 9 is a view when seen from the obliquely rear side. A plurality of projecting portions projecting backward in the axial direction are formed in a rear surface of the annular portion 6a of the insulator 6. Plate-shaped metal terminals, which are not illustrated, are inserted in the axial direction into the three terminal holding portions 6e. The projecting portions 6d at two locations are portions at which the motor 3 is caused to abut the coupling portion (here, a part of the rib 131 illustrated in (3) of FIG. 7) on the outer circumferential side of the motor housing 100. Also, the two projecting portions 6f disposed at positions separated from each other at an angle of 180 degrees in the circumferential direction are portions for sandwiching the sensor substrate 11, and the lengths thereof in the axial direction (forward-backward direction) are slightly shorter than the length of the projecting portion 6d in the axial direction. In this manner, the rear end side of the motor 3 in the axial direction directly abuts the motor housing 100 or indirectly abuts thereon via the sensor 11 by the four portions formed in convex shapes in the axial direction, which are provided in the insulator 6, namely the projecting portions 6d and 6f. Since the abutting of the insulator 6 on the motor housing 100 is performed at the four projecting portions 6d and 6f instead of the surface of the annular portion 6, it is possible to provide a gap, through which air passes, between the four projecting portions 6d and 6f in the circumferential direction. In this manner, it is possible to cause the cooling airflow flowing via the airflow windows 132 (see FIG. 7) from the rear side to efficiently flow to both the inside and the outside of the core of the stator 5.

Figure 10:
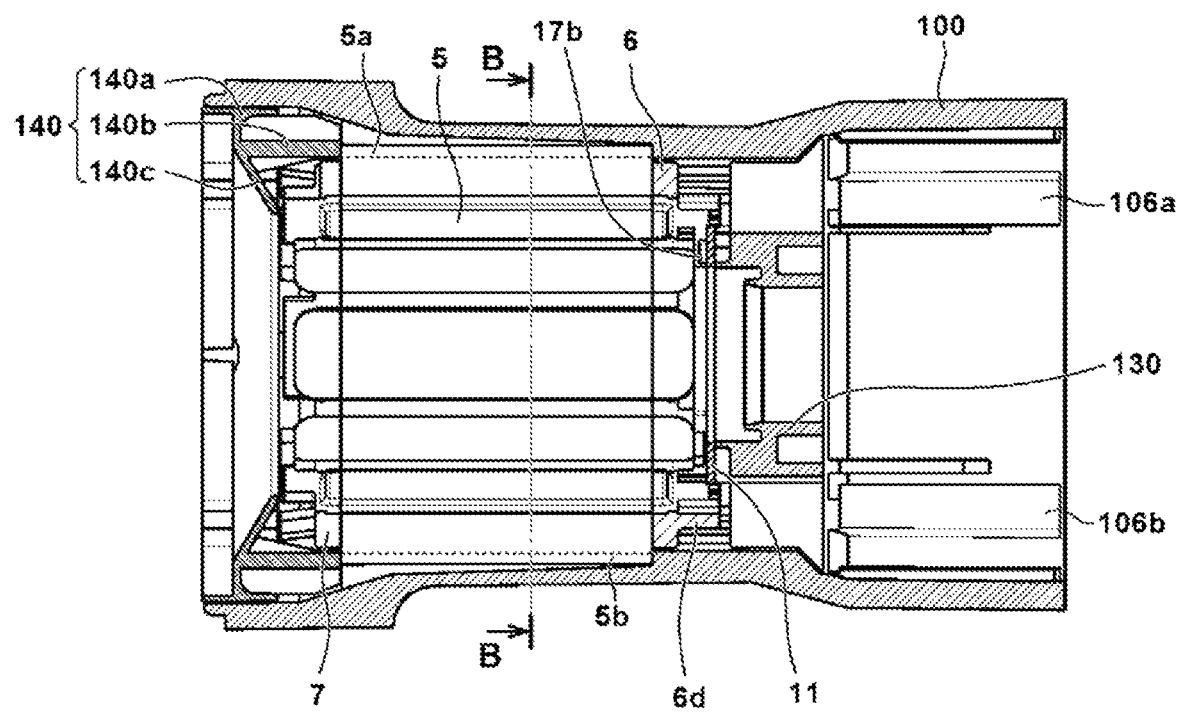
FIG. 10 is a vertical sectional view of a state in which the stator 5 has been attached to the motor housing 100 in FIG. 7.

FIG. 10 is a vertical sectional view of a state in which the stator 5 has been attached to the motor housing 100. FIG. 10 illustrates a section of a vertical surface, and the sectional position is different from that in FIG. 7. Also, FIG. 10 illustrates a state in which not only the insulator 6 but also the core section of the stator 5 and the insulator 7 have been attached and blocked with the fan guide 140. The front side of the fan guide 140 is blocked with a gear case 20 (see FIG.

1) that serves as an opening holding member of the motor housing 100. An outer tubular portion 140a on the outer circumferential side, an inner tubular portion 140b, and a narrowed portion 140c that narrows the opening of the inner tubular portion 140b on the front side obliquely inward are formed at the fan guide 140, and motion of the stator 5 in the axial direction is curbed by holding the keys 5a and 5b of the stator 5 at the rear end surface of the inner tubular portion 140b. The cover member 14 is provided on the front side of the sensor substrate 11, and FIG. 10 illustrates a disposition status of the Hall ICs 17b by illustrating the cover member as being transparent. It is possible to locate the Hall ICs 17b to be sufficiently close to the core portion of the stator 5.

Figure 11:
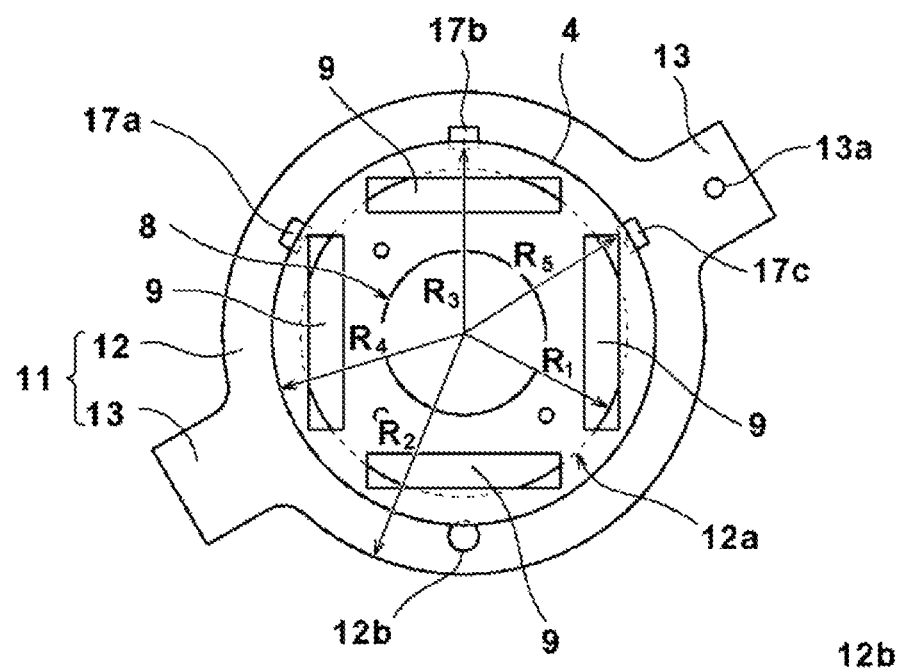
FIG. 11 is a diagram for explaining a positional relationship between the sensor substrate 11 and the stator 5.

FIG. 11 is a diagram for explaining a positional relationship between the sensor substrate 11 and the stator 5. This diagram illustrates a state in which the rear side is seen through from a portion near the section B-B in FIG. 10. Also, the positional relationship is illustrated for easy understanding by illustrating the permanent magnets 9 as being transparent and representing the inner circumferential edge of the sensor substrate 11 by a solid line in FIG. 11. The size of the sensor substrate 11 is set to be sufficiently large to mount the three hole ICs 17a to 17c thereon. Therefore, the sensor substrate 11 may have a sufficient size to mount the Hall ICs 17a to 17c thereon unlike the annular portion 12 continuing in the circumferential direction, for example, the sensor substrate 11 may be an annular member corresponding to a halfway round. The size of the outer edge of the annular portion 12 in the embodiment corresponds to a radius $R_2$, and the size of the inner edge represented by the dotted line corresponds to a radius $R_1$. Meanwhile, a radius of the outer circumferential portion (except for the keys 5a and 5b) of the rotor 4 is $R_4$, and a relationship of $R_1<R_4<R_2$ is established. The rotation axis 8 penetrates inside the rotor 4, and the four plate-shaped permanent magnets 9 are disposed in the surroundings of the rotational shaft 8 such that the permanent magnets 9 are parallel to the rotational shaft 8. Here, the radius $R_3$ of the Hall ICs 17a to 17c at the innermost circumferential position is located at substantially the same position of a radius $R_5$ of the permanent magnets 9 provided at the rotating rotor 4 at the outermost circumferential position, or alternatively, the Hall ICs 17a to 17c are located slightly outside thereof. Ideal mounting positions of the Hall ICs 17a to 17c are disposed inside the radius $R_5$ of the permanent magnets 9 at the outermost circumferential position and within a projection range of the rotating region of the permanent magnets 9 in the axial direction. However, it is still difficult to mount the Hall ICs 17a to 17c at ideal positions on the sensor substrate 11. This is because it is necessary to cause the rotational shaft 8 to pass through the through-hole 12a of the sensor substrate 11 in the state in which the bearing 10b is attached in the state in FIG. 7B when the motor 3 is inserted into and assembled with the motor housing 100. Therefore, it is essential to set the radius $R_1$ of the through-hole 12a to be larger than the radius of the bearing 10b (see FIG. 2). Meanwhile, it is important to set the size (radius $R_2$) of the sensor substrate 11 on the outer circumferential side to be smaller than the annular portion 6a of the insulator 6 such that the airflow windows 132 (see FIG. 7) are not blocked as much as possible. Since the sensor substrate 11 is disposed inside the annular portion 12 in the embodiment in this manner, there is no restriction in terms of the shape for securing the sensor substrate 11 in setting of the shape of the insulator 6.

According to the embodiment, the motor 3 is attached to the motor housing 100 in the axial direction, and the sensor substrate 11 is positioned with the surface on one side in the rotational shaft direction of the motor 3 abutting a part (insulator 6) of the stator 5 and the surface on the other side abutting a part of the motor housing 100 as described above. That is, since the sensor substrate 11 is sandwiched between a part of the stator 5 and a part of the motor housing 100, it is possible to dispose the sensor substrate 11 to be sufficiently close to the rotor 4 and to directly detect a magnetic field of the permanent magnets 9. As a result, it is not necessary to provide a dedicate magnet for the sensor near the rear end of the rotational shaft 8, and it is possible to shorten the entire length of the electrically powered tool 1 and to achieve low costs at the same time. Also, it is possible to dispose the sensor substrate 11 at a portion inside the insulator 6 and thereby to further precisely detect the rotational position. Further, it is possible to easily hold the sensor substrate 11 even in a case in which the sensor substrate 11 is not secured to the motor 5 and the tubular integral motor housing 100 is used. In addition, since it is possible to secure the sensor substrate 11 with a smaller outer diameter than that of the inner circumferential surface of the motor housing 100, in particular, the sensor substrate 11 that is smaller than the outer diameter of the insulator 6 (annular portion 6a) and is sufficiently small to enter the inside of the insulator 6 to the motor housing 100 by securing the sensor substrate 11 to the bottom portion 129 at the wall portion extending inward in the radial direction from the inner circumferential surface of the motor housing 100, a degree of freedom in design increases. In particular, it is not necessary to extend the sensor substrate 11 up to the inner circumferential surface of the motor housing 100 for securing by setting the securing location of the sensor substrate 11 at a position on the outer side beyond the bearing 10b and on the inner side beyond the inner diameter of the annular portion 6a of the insulator 6, and it is possible to reduce the size of the sensor substrate 11. Also, it is possible to reduce the size of the space between the sensor substrate 11 and the motor 3 and thereby to reduce the entire length in the forward-backward direction (the extending direction of the rotational shaft of the motor 3). Further, since the sensor substrate 11 is not secured to the insulator 7, it is not necessary to provide a screw and a screw boss or the like for securing the sensor substrate 11 at the insulator 7 and the sensor substrate 11, and it is possible to reduce the sizes of the insulator 7 and the sensor substrate 11, it is thus possible to reduce the size of the motor housing 100 that supports the motor 3 including the insulator 7 and thus to form a thin and small-sized disc grinder 1.

Second Embodiment

Figure 12:
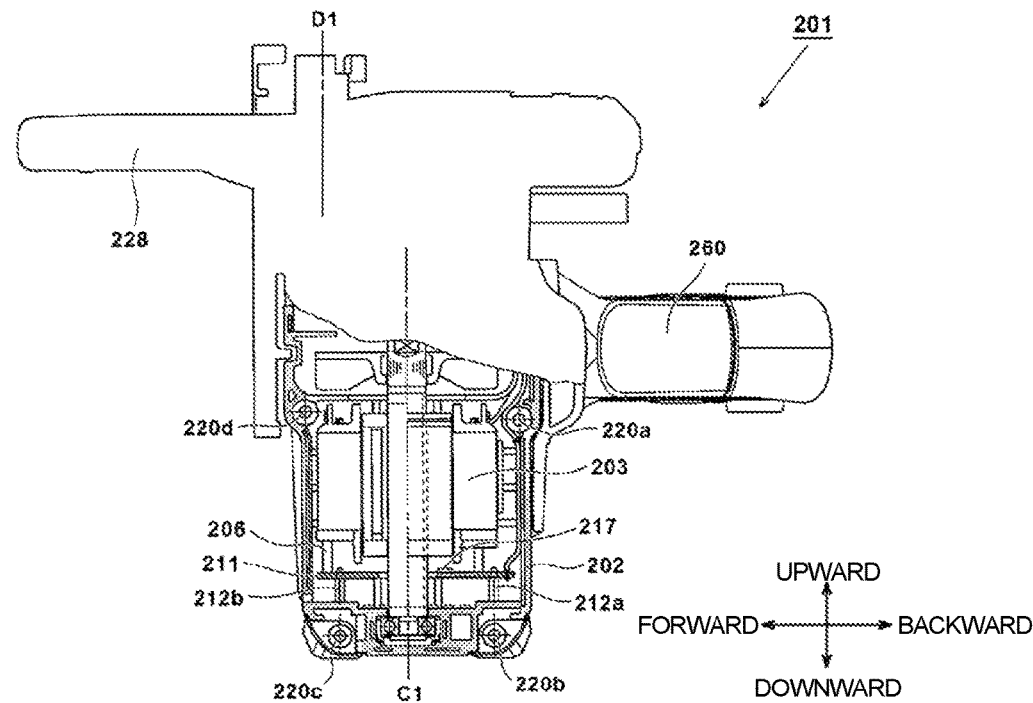
FIG. 12 is a top view illustrating an electrically powered circular saw 201 according to a second embodiment of the disclosure and illustrates a part thereof in a sectional view.

Next, a second embodiment of the disclosure will be described with reference to FIG. 12. FIG. 12 is a top view illustrating an electrically powered circular saw 201 according to the second embodiment of the disclosure, and a part thereof is illustrated in a sectional view. The electrically powered circular saw 201 is a known rotational tool, in which a circular saw blade (not illustrated) rotating about a rotational shaft D1 is contained in the motor housing 202, which is driven by a motor 203. Here, the electrically powered circular saw 201 is driven by an inverter using a motor of a brushless DC type as the motor 203. The motor housing 202 has a shape in which the left side corresponding to the rear side of the motor when seen in an axial direction C1 is closed and the motor housing 202 can be divided into two pieces in the upward-downward direction and is secured with four screws 220a to 220d. A circular saw cover 228 is provided at the right portion of the motor housing 202, and a handle unit 260 is provided at a rear portion. An annular sensor substrate 211 is disposed inside the motor housing 202, and three Hall ICs 217 are mounted on the sensor substrate 211. A plurality of positioning holes are formed in the sensor substrate 211, and the position of the sensor substrate 11 in the upward-downward and forward-backward directions and the rotational direction of the motor 203 is determined by positioning projections 212a and 212b and the like that extend from the inner wall of the motor housing 202 being fitted into the positioning holes, and the sensor substrate 211 is held by the insulator 206 of the motor 203 such that the sensor substrate 211 does not move in a direction (left-right direction) of the axial line C1. Since the sensor substrate 211 is sandwiched such that the sensor substrate 211 abuts both the motor 203 (insulator 206) and the motor housing 202 in this manner, it is possible to assemble the sensor substrate 211 separately from the motor 203 and to assemble a stator, a rotor, and a rotational shaft portion of the motor 203 after the sensor substrate 211 is secured to the motor housing 202 first. Since the sensor substrate is positioned by causing the sensor substrate to abut the motor 203 (insulator 206) and the motor housing 202, it is possible to secure the sensor substrate without using a securing tool such as a screw in the embodiment. Also, a part of the projections 212a an 212b and the like may be screwed such that a securing force for the sensor substrate 211 increases.

In the second embodiment, a motor housing that can be divided along a surface passing through the rotational shaft is used instead of a tubular integrated motor housing, the sensor substrate is secured on the side of the motor housing first and is then sandwiched between the motor and the motor housing, thereby securing the sensor substrate. In this manner, the disclosure is not limited to the motor housing with an integrated structure and can also be applied to an arbitrary motor device using a tubular motor housing that can be divided in a similar manner.

Third Example

Figure 13:
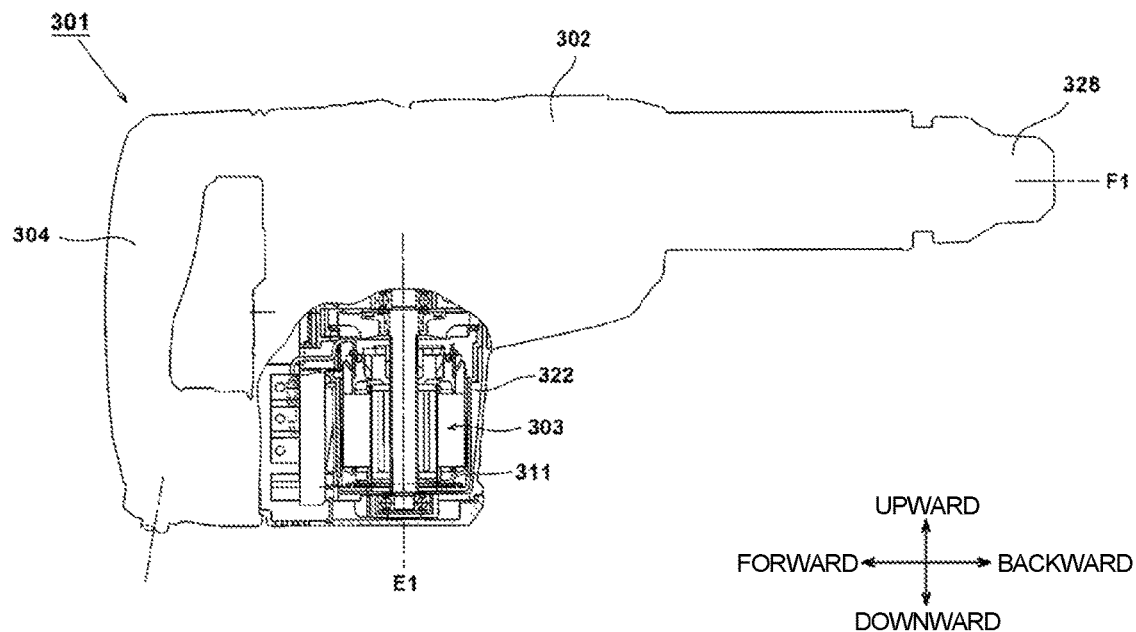
FIG. 13 is a side view illustrating a hammer drill 301 according to a third embodiment of the disclosure and illustrates a part thereof in a sectional view.

FIG. 13 is a side view illustrating a hammer drill 301 according to a third embodiment of the disclosure and illustrates a part in a sectional view. The hammer drill 301 is disposed such that a motor 303 of a brushless DC type extends in the vertical direction along a rotational shaft and causes a tip end tool to rotate about a rotational shaft F1 by a power transmission mechanism, which is not illustrated. Hitting in the direction of the rotational shaft F1 is performed at the same time with or independently from the rotation. The motor 303 is a brushless motor driven by an inverter circuit similarly to the first embodiment. A sensor substrate 311 for mounting Hall ICs (which will be described later with reference to FIG. 14) is provided between the motor 303 and the motor housing 322.

Figure 14:
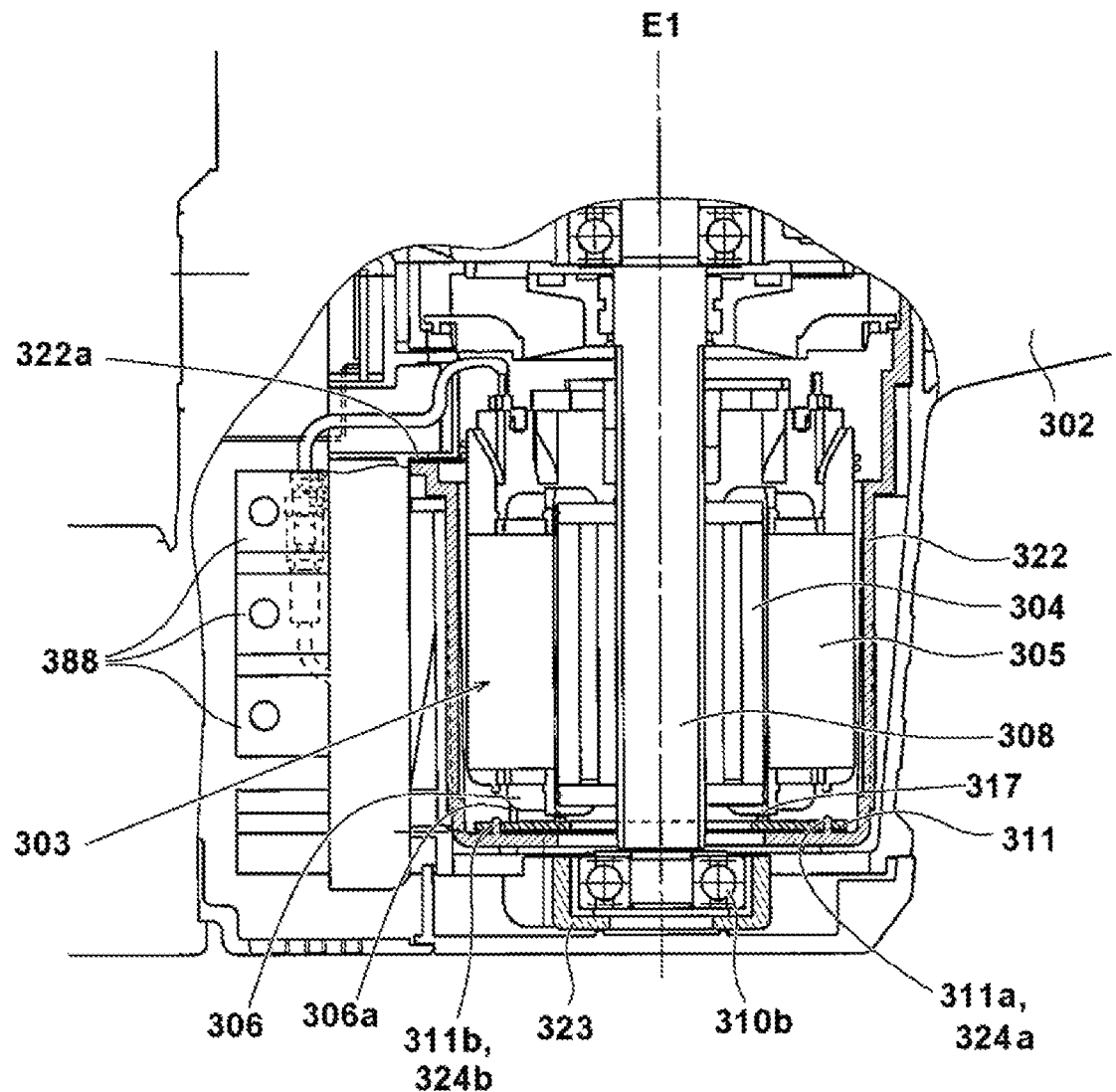
FIG. 14 is a partially enlarged view of a motor portion in FIG. 13.

FIG. 14 is a partially enlarged view of the motor portion in FIG. 13. A motor housing 322 has a cup shape with an opening 322a on the upper side such that the motor housing 322 is not divided along a plane including an axial line E1 and is manufactured through integral molding of a synthetic resin. An annular sensor substrate 311 is disposed from an opening 322a inside the motor housing 322, and a set of the motor 303 in which a bearing 310b is attached to a rotational shaft 308 is then inserted from the opening 322a. At this time, a projecting portion 306a or the like of the insulator 306 attached to the stator 305 abuts the sensor substrate 317. Thereafter, the bearing holder 323 is secured to a main housing 302. As the sensor substrate 311, the annular sensor substrate 311 that mounts three Hall ICs thereon is disposed. The sensor substrate 311 is adapted to be contained inside the motor housing 322, and two positioning through-holes 311a and 311b are formed therein. Also, two projecting portions 324a and 324b extending in a direction parallel to the axial line E1 are formed at an inner bottom portion of the motor housing 322. By containing the set of motor 303 inside the motor housing 322 in a state in which the projecting portions 312a and 312b of the motor housing 322 are caused to penetrate through the through-holes 311a and 311b of the sensor substrate 311, the sensor substrate 311 is sandwiched between the bottom surface of the motor housing 322 in the cup shape and the motor 303, and the sensor substrate 311 is held. Also, although the projecting portions 312a are illustrated at only two locations here, the projecting portions 312a may be provided at three or more locations. Also, since the projecting portions 312a and 312b are only for positioning and stably holding the sensor substrate 311, another positioning mechanism, for example, a recessed portion that holds the entire outer edge of the sensor substrate 311 may be formed at the inner bottom portion of the motor housing 322 such that the sensor substrate is secured at the recessed portion, or alternatively, a securing member such as a screw or an adhesive may be used. The three Hall ICs 317 mounted on the sensor substrate 311 are disposed at positions at which the Hall ICs 317 face a rotor 304 and directly detects a magnetic field generated by the rotor 304. The motor 303 is driven by an inverter circuit configured using a plurality of switching elements 388.

As described above, the disclosure can also be applied to a variety of electrically powered tools as in the first to third embodiments, enables precise detection of a rotational position of the rotor, and enables such holding of the sensor substrate that leads to a decrease in size of the main body.

What is claimed is:

1. An electrically powered tool comprising:
   a brushless motor that has a rotor and a stator;
   a cylindrical and integrally shaped housing that contains the brushless motor in an axial direction and has a bottom portion;
   a control unit that controls the brushless motor; and
   a sensor substrate that has a sensor mounted thereon for detecting a rotational position of the rotor and has a first surface on a side in the axial direction and a second surface on the other side in the axial direction,
   a recessed portion formed at the bottom portion,
   an attachment portion that extends outward in a radial direction from an annular portion is formed at the sensor substrate
   wherein the attachment portion is fitted into the recessed portion for specifying a position of the sensor substrate in a circumferential direction, and
   wherein the brushless motor is attached to the housing in the axial direction, and the first surface of the sensor substrate abuts the stator, and the second surface of the sensor substrate abuts the bottom portion of the cylindrical and integrally shaped housing.

2. The electrically powered tool according to claim 1, wherein an insulating member that holds a coil is provided at an end of the stator in the axial direction,
   the bottom portion has a base unit that holds the sensor substrate such that the sensor substrate does not move in the axial direction is formed at the housing, and
   the sensor substrate abuts the insulating member and the base unit.

3. The electrically powered tool according to claim 1, wherein the sensor substrate is an annular print substrate, is disposed so as to be orthogonal to a rotational shaft of the brushless motor, and has a plurality of magnetic detection elements mounted thereon such that the magnetic detection elements are disposed in the circumferential direction on a surface thereof on a side of the brushless motor.

4. The electrically powered tool according to claim 3, wherein the housing is a resin or metal integrated article and has a coupling unit that restricts a containing position of the brushless motor in the axial direction, the bottom portion has a bearing holding unit that secures one of bearings that axially support the rotational shaft of the brushless motor and is formed at an axial center position of the coupling unit, and the sensor substrate abuts the coupling unit on an outer circumferential side beyond the bearing holding unit.

5. The electrically powered tool according to claim 4, wherein an inverter circuit for driving the brushless motor is provided, a plurality of permanent magnets are disposed in the rotor at equal intervals in the circumferential direction inside the stator, the magnetic detection elements detect a change in a magnetic pole from the permanent magnets and outputs the change to the control unit, and the control unit controls the inverter circuit by detecting the rotational position of the rotor from the output of the magnetic detection elements.

6. The electrically powered tool according to claim 5, wherein a cover member that covers the sensor such that the sensor is not exposed to outside is provided at the sensor substrate.

7. The electrically powered tool according to claim 6, wherein a projecting portion that continues in the axial direction is formed in an outer circumferential portion of the stator, the recessed portion corresponds to the projecting portion and is formed in an inner circumferential portion of a portion, at which the motor is contained, in the housing, and the motor is secured inside the housing by an insertion-side opening of the housing being closed with an opening holding member after the motor is contained in the housing.

8. The electrically powered tool according to claim 1, wherein the sensor substrate is sandwiched between a part of the brushless motor and a part of the housing.

9. The electrically powered tool according to claim 1, wherein the sensor substrate is provided with a through-hole, a positioning portion is provided with the housing, and wherein the positioning portion comprises a rod-shaped member that passes through the through-hole.

10. The electrically powered tool according to claim 9, wherein the rod-shaped member is a projection provided on the housing.

11. The electrically powered tool according to claim 1, wherein a positioning portion is provided at the cylindrical and integrally shaped housing and engages with the sensor substrate to restrict a rotation of the sensor substrate in a rotational direction of the rotor and/or a movement in the axial direction.

12. The electrically powered tool according to claim 11, wherein the sensor substrate is provided with a through-hole, and the positioning portion comprises a rod-shaped member that passes through the through-hole.

13. The electrically powered tool according to claim 12, wherein the rod-shaped member is a projection provided on the housing.

14. The electrically powered tool according to claim 13, wherein the rod-shaped member is a screw.

15. The electrically powered tool according to claim 1, wherein the bottom portion is extending inward in the radial direction from an inner side surface of the cylindrical and integrally shaped housing.

\* \* \* \* \*